(12) United States Patent
Teyeb et al.

(10) Patent No.: US 12,207,145 B2
(45) Date of Patent: *Jan. 21, 2025

(54) METHODS FOR RELAY MEASUREMENTS

(71) Applicant: INTERDIGITAL PATENT HOLDINGS, INC., Wilmington, DE (US)

(72) Inventors: Oumer Teyeb, Montreal (CA); Martino Freda, Laval (CA); Jaya Rao, Montreal (CA); Tuong Hoang, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/771,668

(22) Filed: Jul. 12, 2024

(65) Prior Publication Data
US 2024/0365182 A1    Oct. 31, 2024

Related U.S. Application Data

(63) Continuation of application No. 18/271,967, filed as application No. PCT/US2022/012135 on Jan. 12, 2022.

(Continued)

(51) Int. Cl.
*H04W 36/00* (2009.01)
*H04W 36/30* (2009.01)

(52) U.S. Cl.
CPC ... *H04W 36/0058* (2018.08); *H04W 36/0066* (2013.01); *H04W 36/03* (2018.08); *H04W 36/30* (2013.01)

(58) Field of Classification Search
CPC ......... H04W 36/0055; H04W 36/0058; H04W 36/0066; H04W 36/03; H04W 36/035;
(Continued)

(56) References Cited

U.S. PATENT DOCUMENTS

2012/0243431 A1    9/2012   Chen et al.
2016/0119037 A1*   4/2016   Won .................... H04B 7/0619
                                                            370/328
(Continued)

FOREIGN PATENT DOCUMENTS

EP    3 606 164    2/2020

OTHER PUBLICATIONS

Futurewei, "Service Continuity with Sidelink Relay," 3GPP TSG-RAN WG2 Meeting #112e, R2-2009301, Electronic Meeting (Nov. 2-13, 2020).

(Continued)

*Primary Examiner* — Matthew W Genack
(74) *Attorney, Agent, or Firm* — VOLPE KOENIG

(57) ABSTRACT

As disclosed herein, there is one or more system, device, and/or method that addresses one or more of the following, but is not limited to: wireless transmit receive unit (WTRU)(s) configured to send sidelink radio link measurements to a base station (e.g., gNB); WTRU(s) configured to consider CBR/CR levels for starting performing measurements on neighbor links/cells; WTRU(s) configured to consider CBR/CR levels in conjunction with SL RSRP/RSRQ/RSNI thresholds for reporting measurements; WTRU(s) configured to report sidelink measurements in different ways depending on the measurements being performed using data or discovery signals; relay WTRU(s) configured to forward/report sidelink measurements to a gNB; handover commands in a relay scenario based on measurements at a remote WTRU.

20 Claims, 20 Drawing Sheets

Related U.S. Application Data

(60) Provisional application No. 63/136,510, filed on Jan. 12, 2021.

(58) Field of Classification Search
CPC .. H04W 36/30; H04W 36/302; H04W 36/304
See application file for complete search history.

(56) References Cited

U.S. PATENT DOCUMENTS

| | | | | |
|---|---|---|---|---|
| 2021/0168682 | A1* | 6/2021 | Xu | H04W 76/23 |
| 2022/0078685 | A1* | 3/2022 | Ly | H04W 36/06 |
| 2022/0256524 | A1* | 8/2022 | Kwon | H04W 72/12 |
| 2023/0247513 | A1* | 8/2023 | Paladugu | H04W 36/033 370/315 |

OTHER PUBLICATIONS

InterDigital Inc., "Control Plane Procedures for L2 UE to NW Relays," 3GPP RAN WG2 Meeting #113bis electronic, R2-2102810, Online (Apr. 2021).

InterDigital Inc., "Service Continuity for L2 UE to NW Relays," 3GPP RAN WG2 Meeting #114 electronic, R2-2104872, Online (May 2021).

OPPO, "Revised SID: Study on NR sidelink relay," 3GPP TSG RAN Meeting #89e, RP-201474, Electronic Meeting (Sep. 14-18, 2020).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," 3GPP TS 36.300 V15.4.0 (Dec. 2018).

Third Generation Partnership Project, "Technical Specification Group Radio Access Network; Study on further enhancements to LTE Device to Device (D2D), User Equipment (UE) to network relays for Internet of Things (IOT) and wearables; (Release 15)," 3GPP TR 36.746 V15.1.1 (Apr. 2018).

Third Generation Partnership Project, "Technical Specification Group Radio Access Network; NR; NR and NG-RAN Overall Description; Stage 2 (Release 16)," 3GPP TS 38.300 V16.4.0 (Dec. 2020).

Third Generation Partnership Project, "Technical Specification Group Radio Access Network; NR; Radio Resource Control (RRC) protocol specification (Release 16)," 3GPP TS 38.331 V16.3.1 (Jan. 2021).

Third Generation Partnership Project, "Technical Specification Group Radio Access Network; NR; Radio Resource Control (RRC) protocol specification (Release 16)," 3GPP TS 38.331 V16.7.0 (Dec. 2021).

Third Generation Partnership Project, "Technical Specification Group Radio Access Network; NR; Medium Access Control (MAC) protocol specification (Release 16)," 3GPP TS 38.321 V16.3.0 (Dec. 2020).

Third Generation Partnership Project, "Technical Specification Group Services and System Aspects; Study on system enhancement for Proximity based Services (ProSe) in the 5G System (5GS) (Release 17)," 3GPP TR 23.752 V0.6.0 (Nov. 2020).

Third Generation Partnership Project, "Technical Specification Group Services and System Aspects; Study on system enhancement for Proximity based Services (ProSe) in the 5G System (5GS) (Release 17)," 3GPP TR 23.752 V17.0.0 (Mar. 2021).

Third Generation Partnership Project, "Technical Specification Group Services and System Aspects; Study on system enhancement for Proximity based Services (ProSe) in the 5G System (5GS) (Release 17)," 3GPP TR 23.752 V1.0.0 (Nov. 2020).

Third Generation Partnership Project, "Technical Specification Group Radio Access Network; NR; Medium Access Control (MAC) protocol specification (Release 16)," 3GPP TS 38.321 V16.7.0 (Dec. 2021).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 16)," 3GPP TS 36.300 V16.4.0 (Dec. 2020).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 16)," 3GPP TS 36.300 V16.7.0 (Dec. 2021).

Third Generation Partnership Project, "Technical Specification Group Radio Access Network; NR; NR and NG-RAN Overall Description; Stage 2 (Release 16)," 3GPP TS 38.300 V16.1.0 (Mar. 2020).

Third Generation Partnership Project, "Technical Specification Group Radio Access Network; NR; NR and NG-RAN Overall Description; Stage 2 (Release 16)," 3GPP TS 38.300 V16.8.0 (Dec. 2021).

Third Generation Partnership Project, "Technical Specification Group Radio Access Network; Study on NR sidelink relay; (Release 17)," 3GPP TR 38.836 V1.0.0, RP-202250 (Dec. 2020).

Third Generation Partnership Project, "Technical Specification Group Radio Access Network; Study on NR sidelink relay; (Release 17)," 3GPP TR 38.836 V17.0.0 (Mar. 2021).

Third Generation Partnership Project, "Technical Specification Group Radio Access Network; NR; Requirements for support of radio resource management (Release 17)," 3GPP TS 38.133 V17.0.0 (Dec. 2020).

Third Generation Partnership Project, "Technical Specification Group Radio Access Network; NR; Requirements for support of radio resource management (Release 17)," 3GPP TS 38.133 V17.4.0 (Dec. 2021).

Vivo, "Protocol stack and service continuity for L2 and L3 relay," 3GPP TSG-RAN WG2 Meeting #111-e, R2-2007041, E-Meeting, (Aug. 17-28, 2020).

* cited by examiner

METHODS FOR RELAY MEASUREMENTS

CROSS-REFERENCE TO RELATED APPLICATIONS

This application is a continuation of U.S. patent application Ser. No. 18/271,967, filed Jul. 12, 2023, which is the U.S. National Stage, under 35 U.S.C. § 371, of International Application No. PCT/US2022/012135, filed Jan. 12, 2022, which claims the benefit of Provisional Application No. 63/136,510, filed Jan. 12, 2021, the contents of which are incorporated herein by reference.

BACKGROUND

Generally, there is a need to improve systems, devices, and methods related to wireless communication as use cases and performance requirements change. For example, there is a need to address device to network and device to device coverage extension.

SUMMARY

As disclosed herein, there is one or more system, device, and/or method that addresses one or more of the following, but is not limited to: wireless transmit receive unit (WTRU)(s) configured to send sidelink radio link measurements to a base station (e.g., gNB); WTRU(s) configured to consider CBR/CR levels for starting performing measurements on neighbor links/cells; WTRU(s) configured to consider CBR/CR levels in conjunction with SL RSRP/RSRQ/RSNI thresholds for reporting measurements; WTRU(s) configured to report sidelink measurements in different ways depending on the measurements being performed using data or discovery signals; relay WTRU(s) configured to forward/report sidelink measurements to a gNB; handover commands in a relay scenario based on measurements at a remote WTRU.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
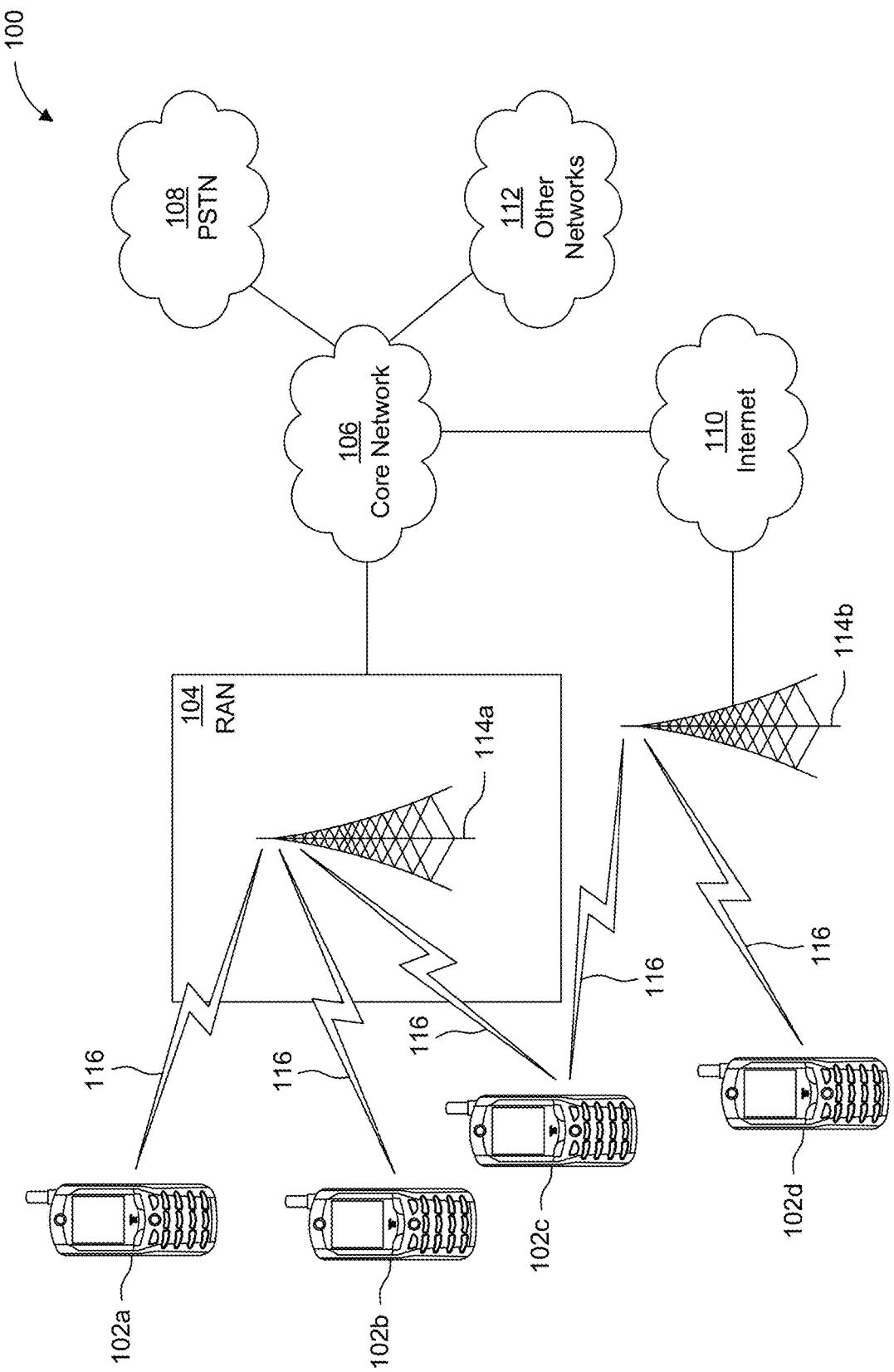
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like; further, as discussed herein, reference to a base station may refer to any of the aforementioned examples, and it is also intended that reference to any of the specific examples may be interchangeable with the more general concept of a base station. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
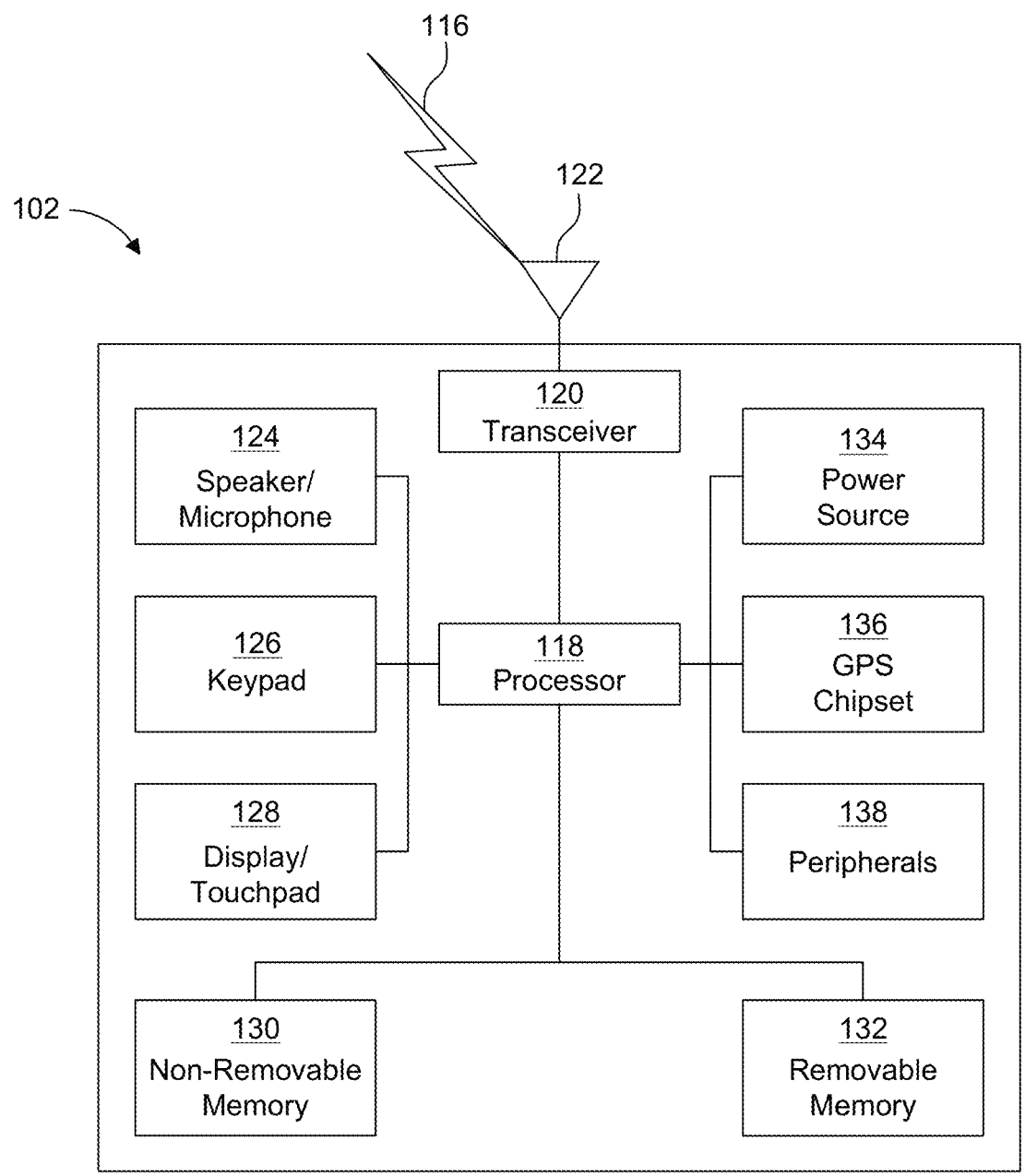
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCad), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
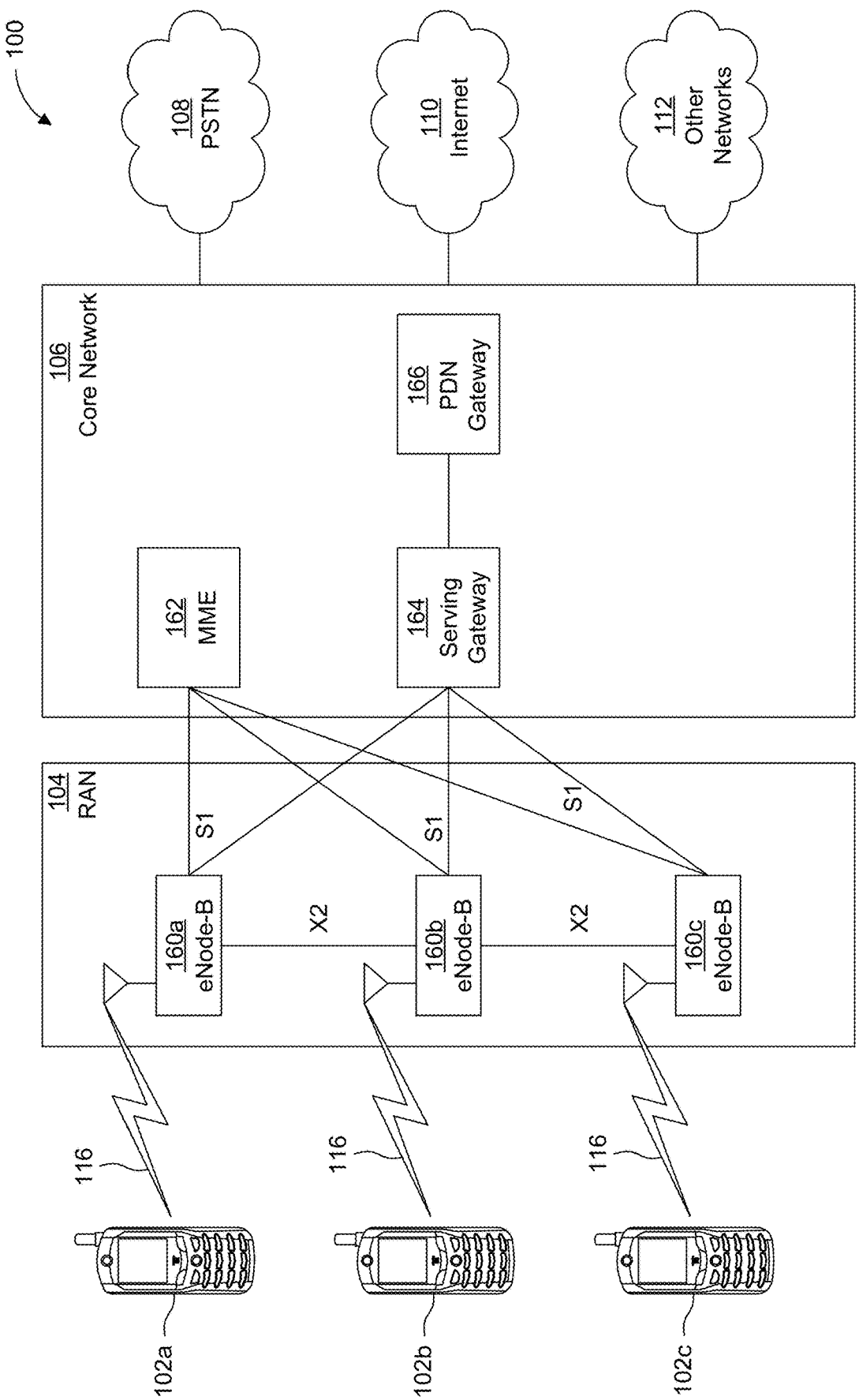
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
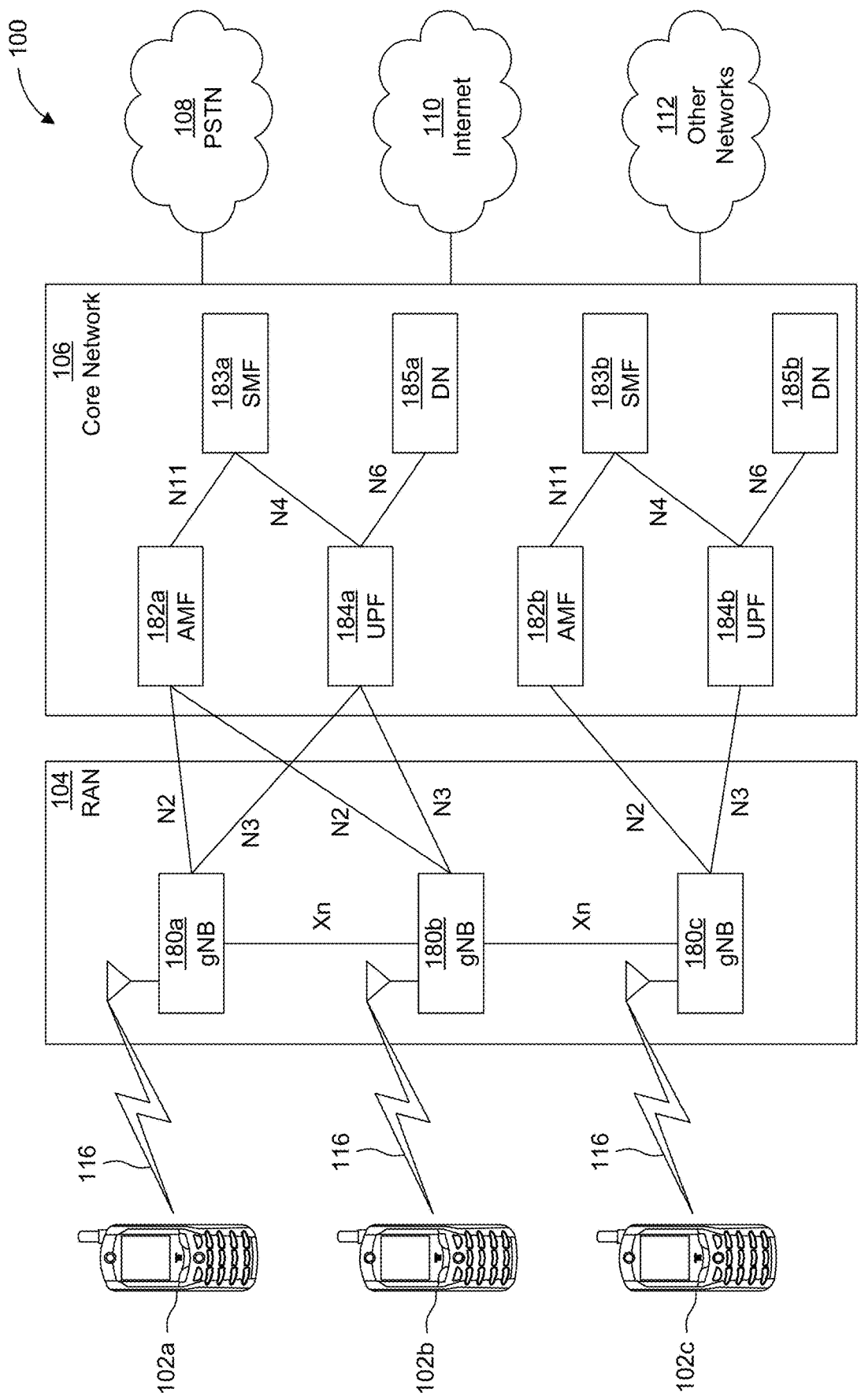
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 106 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While the foregoing elements are depicted as part of the CN 106, it will be appreciated that any of these elements may be owned and/or operated by an entity other than the CN operator.

The AMF 182*a*, 182*b* may be connected to one or more of the gNBs 180*a*, 180*b*, 180*c* in the RAN 104 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of non-access stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and the like. The AMF 182*a*, 182*b* may provide a control plane function for switching between the RAN 104 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 106 via an N11 interface. The SMF 183*a*, 183*b* may also be connected to a UPF 184*a*, 184*b* in the CN 106 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 104 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local DN 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In some cases, NR sidelink may support a number of use cases where a WTRU may be remote and mobile (e.g., V2X related road safety services). In these cases, there may be broadcast, groupcast, and unicast communications in both out-of-coverage and in-NW coverage scenarios. Additionally, in these cases there may also be consideration of sidelink-based relaying functionality in order for sidelink/network coverage extension and power efficiency improvement for a wide variety of applications and services scenarios. For WTRU-to-NW coverage extension, Uu coverage reachability may be necessary for WTRUs to reach a server in a PDN network or a counterpart WTRU out of proximity area. However, in some legacy systems WTRU-to-NW relay is limited to EUTRA-based technology, and thus may not be applied to NR-based systems (e.g., for NG-RAN and NR-based sidelink communication). For WTRU-to-WTRU coverage extension, proximity reachability may be limited to a single-hop sidelink, either via EUTRA-based or NR-based sidelink technology. However, this may not be sufficient in a scenario where there is no Uu coverage, considering limited single-hop sidelink coverage. Overall, there is a need for sidelink connectivity to be further extended in NR frameworks, in order to, for example, support enhanced QoS requirements.

For single hop NR sidelink relays, it may be desirable for there to be approaches that address requirements for sidelink-based WTRU-to-NW and WTRU-to-WTRU relay. In one example, there may be focus on the following aspects as it relates to layer-3 relay and layer-2 relay (e.g., RAN2): relay (re-)selection criterion and procedure; relay/remote WTRU authorization; QoS for relaying functionality; Service continuity; Security of relayed connection after SA3 has provided its conclusions; and/or impact on user plane protocol stack and control plane procedure (e.g., connection management of relayed connection).

Also, for single hop NR sidelink relays, it may be desirable for there to be approaches for upper layer operations of discovery model/procedure for sidelink relaying, assuming no physical layer channel/signal (e.g., RAN2).

In some instances, WTRU-to-NW relay(s) and WTRU-to-WTRU relay(s) may use the same relaying approach.

In some instances, layer-2 WTRU-to-NW relay may build off of the architecture of end-to-end PDCP and hop-by-hop RLC.

In examples relating WTRU-to-NW relays in LTE, relaying via ProSe WTRU-to-NW relay(s) may extend network coverage to an out of coverage WTRU by using PC5 (e.g., D2D) between an out of coverage WTRU and a WTRU-to-NW relay. A ProSe WTRU-to-NW relay may provide a generic L3 forwarding function that can relay any type of IP traffic between the remote WTRU and the network. One-to-one and one-to-many sidelink communications may be used between the remote WTRU(s) and the ProSe WTRU-to-NW relay. For both remote WTRU and relay WTRU only one single carrier (e.g., Public Safety ProSe Carrier) operation may be supported (e.g., Uu and PC5 may be the same carrier for relay/remote WTRU). The remote WTRU may be authorized by upper layers and may be in-coverage of the Public Safety ProSe Carrier or out-of-coverage on any supported carriers including Public Safety ProSe Carrier for WTRU-to-NW relay discovery, (re)selection and communication. The ProSe WTRU-to-NW relay is always in-coverage of EUTRAN. The ProSe WTRU-to-NW relay and the remote WTRU may perform sidelink communication and sidelink discovery.

Relay selection/reselection for ProSe WTRU-to-NW relays may be performed based on a combination of a AS layer quality measurements (e.g., RSRP) and/or upper layer criteria. In one situation, the eNB may control whether the WTRU can act as a ProSe WTRU-to-NW relay. In one example, if the eNB broadcast any information associated to ProSe WTRU-to-NW relay operation, then the ProSe WTRU-to-NW relay operation may be supported in the cell. In another example, if the ProSe-WTRU-to-NW relay is initiated by broadcast signaling, it may perform ProSe WTRU-to-NW relay discovery when in RRC_IDLE, and/or if the ProSe WTRU-to-NW relay is initiated by dedicated signaling, it may perform relay discovery as long as it is in RRC_CONNECTED. In another example, the eNB may provide one or more of the following: transmission resources for ProSe WTRU-to-NW relay discovery using broadcast signaling for RRC_IDLE state and dedicated signaling for RRC_CONNECTED state; reception resources for ProSe WTRU-to-NW relay discovery using broadcast signaling; if the eNB does not broadcast transmission resource pools for ProSe-WTRU-to-NW relay discovery, then a WTRU may initiate a request for ProSe-WTRU-to-NW relay discovery resources by dedicated signaling, respecting these broadcasted threshold(s); and/or, the eNB may broadcast a minimum and/or a maximum Uu link quality (RSRP) threshold(s) that the ProSe WTRU-to-NW relay needs to respect before it can initiate a WTRU-to-NW relay discovery procedure, where in RRC_IDLE, when the eNB broadcasts transmission resource pools, the WTRU may use the threshold(s) to autonomously start or stop the WTRU-to-NW relay discovery procedure, where in RRC_CONNECTED, the WTRU may use the threshold(s) to determine if it can indicate to the eNB that it is a relay WTRU and wants to start ProSe WTRU-to-NW relay discovery.

A ProSe WTRU-to-NW relay performing sidelink communication for ProSe WTRU-to-NW relay operation may need to be in RRC_CONNECTED. After receiving a layer-2 link establishment request or TMGI monitoring request (e.g., upper layer message), from the remote WTRU, the ProSe WTRU-to-NW relay may indicate to the eNB that it is a ProSe WTRU-to-NW relay and intends to perform ProSe WTRU-to-NW relay sidelink communication. The eNB may provide resources for ProSe WTRU-to-NW relay communication.

The remote WTRU may decide when to start monitoring for ProSe WTRU-to-NW relay discovery. The remote WTRU may transmit ProSe WTRU-to-NW relay discovery solicitation messages while in RRC_IDLE or in RRC_CONNECTED depending on the configuration of resources for ProSe WTRU-to-NW relay discovery. The eNB may broadcast a threshold, which is used by the remote WTRU to determine if it can transmit ProSe WTRU-to-NW relay discovery solicitation messages, to connect or communicate with ProSe WTRU-to-NW relay WTRU. The RRC_CONNECTED remote WTRU, may use the broadcasted threshold to determine if it can indicate to eNB that it is a remote WTRU and wants to participate in ProSe WTRU-to-NW relay discovery and/or communication. The eNB may provide, transmission resources using broadcast or dedicated signaling and reception resources using broadcast signaling for ProSe WTRU-to-NW relay Operation. The remote WTRU may stop using ProSe WTRU-to-NW relay discovery and communication resources when RSRP goes above the broadcasted threshold.

Note, the exact time of traffic switching from Uu to PC5 or vice versa may be up to a higher layer.

The remote WTRU may perform radio measurements at a PC5 interface and may use them for ProSe WTRU-to-NW relay selection and reselection along with higher layer criterion. A ProSe WTRU-to-NW relay may be considered suitable in terms of radio criteria if the PC5 link quality exceeds configured threshold (e.g., preconfigured or provided by eNB). The remote WTRU may select the ProSe WTRU-to-NW relay, which satisfies higher layer criterion and has the best PC5 link quality among all suitable ProSe WTRU-to-NW relays.

The remote WTRU may triggers ProSe WTRU-to-NW relay reselection when: PC5 signal strength of current ProSe WTRU-to-NW relay is below configured signal strength threshold; and/or, it receives a layer-2 link release message (e.g., upper layer message, from ProSe WTRU-to-NW relay).

In some scenarios where there are WTRU-to-NW relays operating in a RAN relating to commercial use cases, such as those tailored to wearables and IoT devices. In contrast to ProSe WTRU-to-NW relays which may use L3 (e.g., IP layer) relaying approaches, the WTRU-to-NW relays for wearables may be a L2 relay based on the protocol stacks shown in the example of FIG. 2 and/or FIG. 3.

Figure 2:
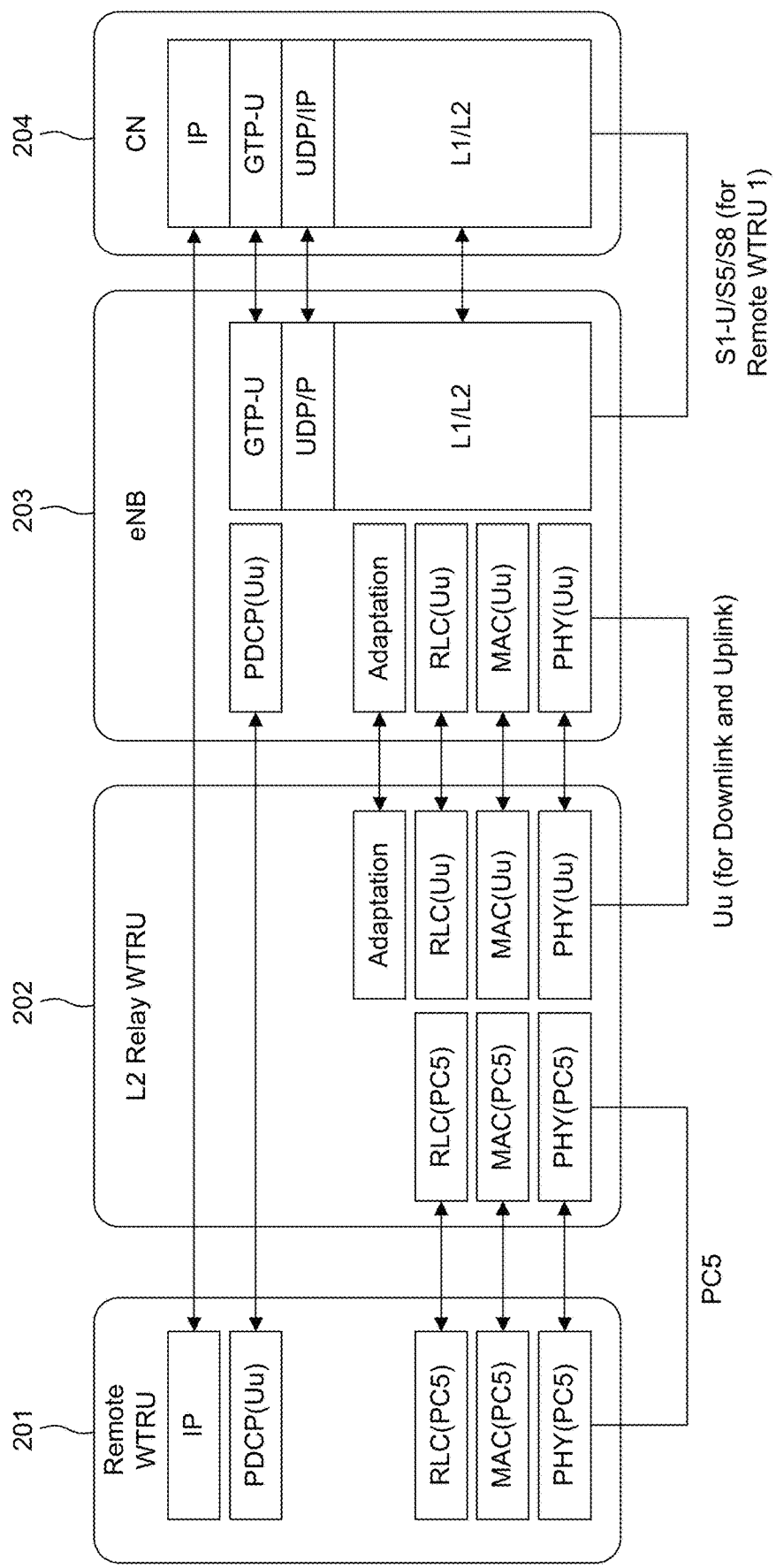
FIG. 2 illustrates an example of a user plane radio protocol stack for layer 2 evolved WTRU-to-NW relay (e.g., PC5)

FIG. 2 illustrates an example of a user plane radio protocol stack for layer 2 evolved WTRU-to-NW relay (e.g., PC5). The protocol stack may be shown across multiple entities, such as a remote WTRU at 201, a L2 relay WTRU at 202, an eNB at 203, and the CN at 204.

Figure 3:
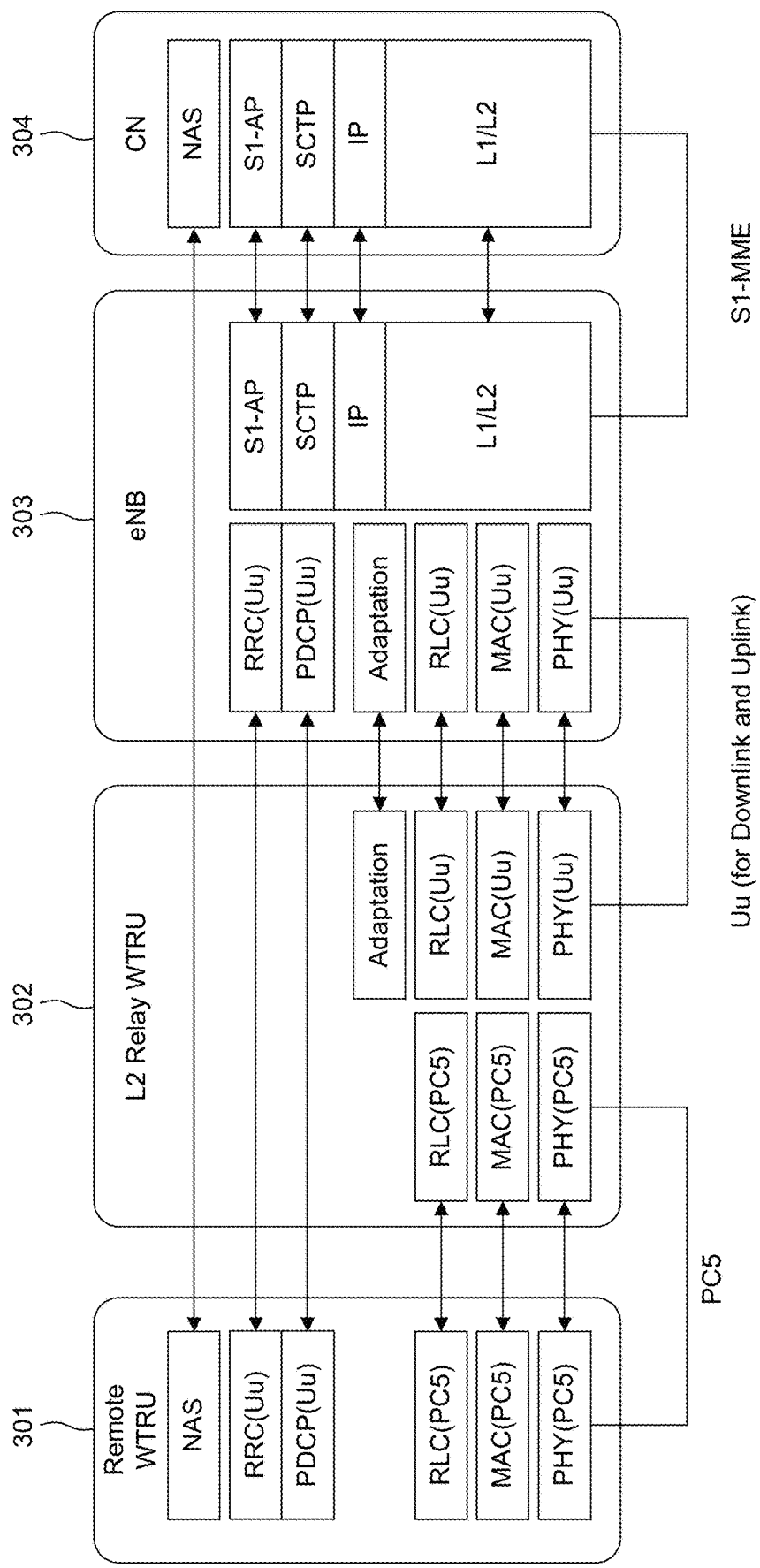
FIG. 3 illustrates an example of a control plane radio protocol stack for layer 2 evolved WTRU-to-NW relay (e.g., PC5)

FIG. 3 illustrates an example of a control plane radio protocol stack for layer 2 evolved WTRU-to-NW relay (e.g., PC5). The protocol stack may be shown across multiple entities, such as a remote WTRU at 201, a L2 relay WTRU at 202, an eNB at 203, and the CN at 204.

In some instances, relay approaches (e.g., in LTE) may be based on a one-to-one communication link established at upper layers (e.g., ProSe layer) between two WTRUs (e.g., the remote WTRU and the WTRU-to-NW relay). Such a connection may be transparent to the AS layer and connection management signaling, and procedures performed at the upper layers may be carried by AS layer data channels. The AS layer may be, therefore, unaware of the one-to-one connection. In some instances (e.g., NR V2X), the AS layer may support the notion of a uncast link between two WTRUs. Such a unicast link may be initiated by upper layers (e.g., as in the ProSe one-to-one connection). However, the AS layer may be informed of the presence of this unicast link, and any data that is transmitted in unicast fashion between the peer WTRUs. With such knowledge, the AS layer may support HARQ feedback, CQI feedback, and power control schemes that are specific to unicast. There may be one or more processes, as described herein, for connection establishment for unicast links in NR (e.g., V2X NR).

A unicast link at the AS layer may be supported via a PC5-RRC connection. The PC5-RRC connection may be a logical connection between a pair of a Source Layer-2 ID and a Destination Layer-2 ID in the AS. One PC5-RRC connection may correspond to one PC5 unicast link. The PC5-RRC signaling may be initiated after its corresponding PC5 unicast link establishment. The PC5-RRC connection and the corresponding sidelink SRBs and sidelink DRBs may be released when the PC5 unicast link is released as indicated by upper layers.

For each PC5-RRC connection of unicast, one sidelink SRB may be used to transmit the PC5-S messages before the PC5-S security has been established. One sidelink SRB may be used to transmit the PC5-S messages to establish the PC5-S security. One sidelink SRB may be used to transmit the PC5-S message(s) after the PC5-S security has been established, which is protected. One sidelink SRB may be used to transmit the PC5-RRC signaling, which is protected and only sent after the PC5-S security has been established.

PC5-RRC signaling may include a sidelink configuration message (RRCReconfigurationSidelink) where one WTRU configures the RX-related parameters of each SLRB in the peer WTRU. Such reconfiguration message may configure the parameters of each protocol in the L2 stack (SDAP, PDCP, etc.). The receiving WTRU may confirm or reject such configuration, depending on whether it can support the configuration suggested by the peer WTRU.

Figure 4:
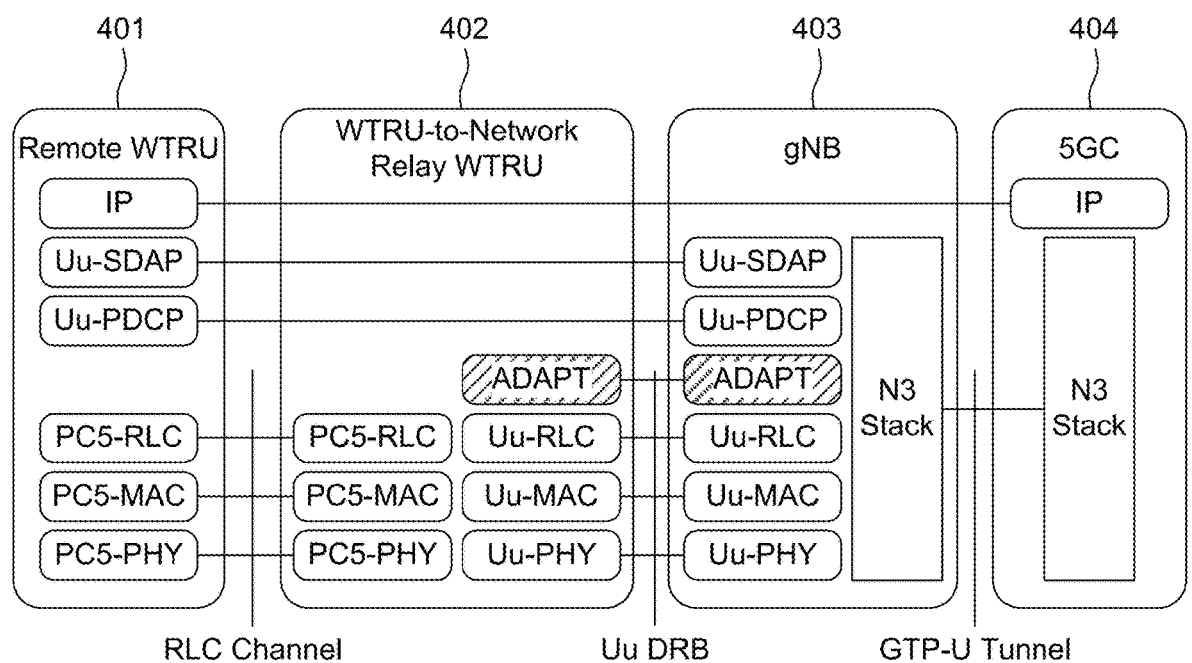
FIG. 4 illustrates an example of a user plane stack for NR L2 WTRU-to-NW relay (no adaption layer at PC5)

FIG. 4 illustrates an example of a user plane stack for NR L2 WTRU-to-NW relay (no adaption layer at PC5). The protocol stack may be shown across multiple entities, such as a remote WTRU at 401, a WTRU-to-NW relay at 402, an gNB at 403, and a 5GC at 404.

Figure 5:
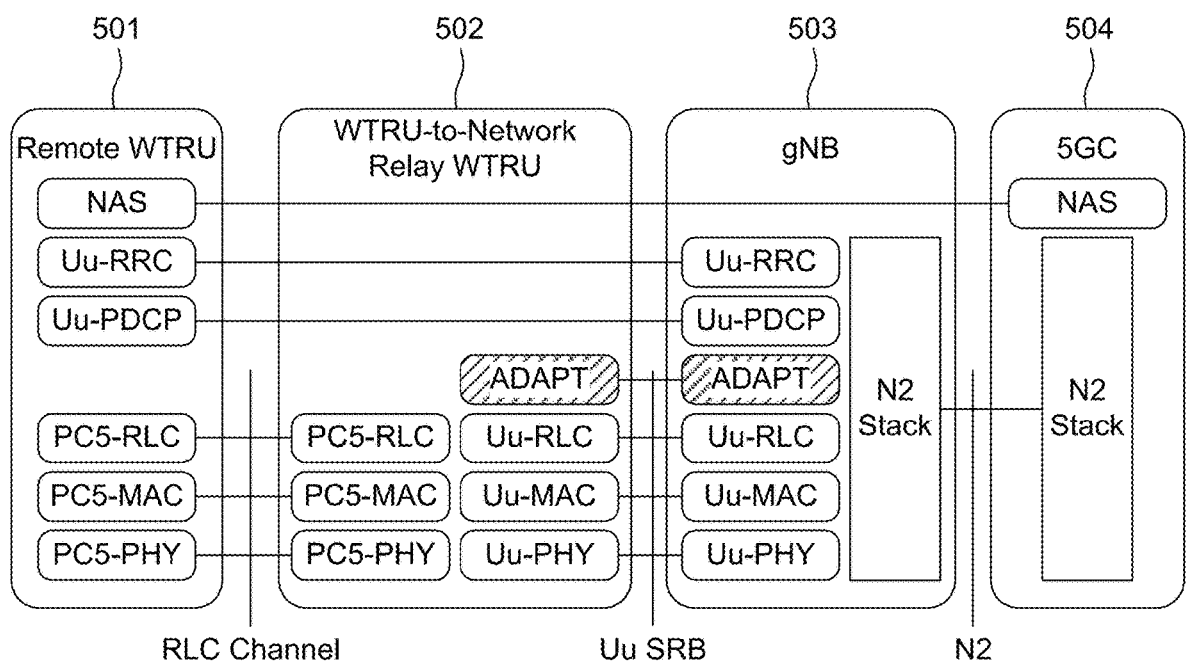
FIG. 5 illustrates an example of a control plane protocol stack for L2 WTRU-to-NW relay (no adaptation layer at PC5)

FIG. 5 illustrates an example of a control plane protocol stack for L2 WTRU-to-NW relay (no adaptation layer at PC5). The protocol stack may be shown across multiple entities, such as a remote WTRU at 501, a WTRU-to-NW relay at 502, an gNB at 503, and a 5GC at 504.

The protocol stacks for the user plane and control plane for NR L2 WTRU-to-NW relay architecture is shown in the examples of FIG. 4 and FIG. 5.

For L2 WTRU-to-NW relay, the adaptation layer may be placed over RLC sublayer for both CP and UP at the Uu interface between relay WTRU and gNB. The Uu SDAP/PDCP and RRC may be terminated between remote WTRU and gNB, while RLC, MAC and PHY may be terminated in each link (e.g., the link between remote WTRU and WTRU-to-NW relay WTRU and the link between WTRU-to-NW relay WTRU and the gNB).

Figure 6:
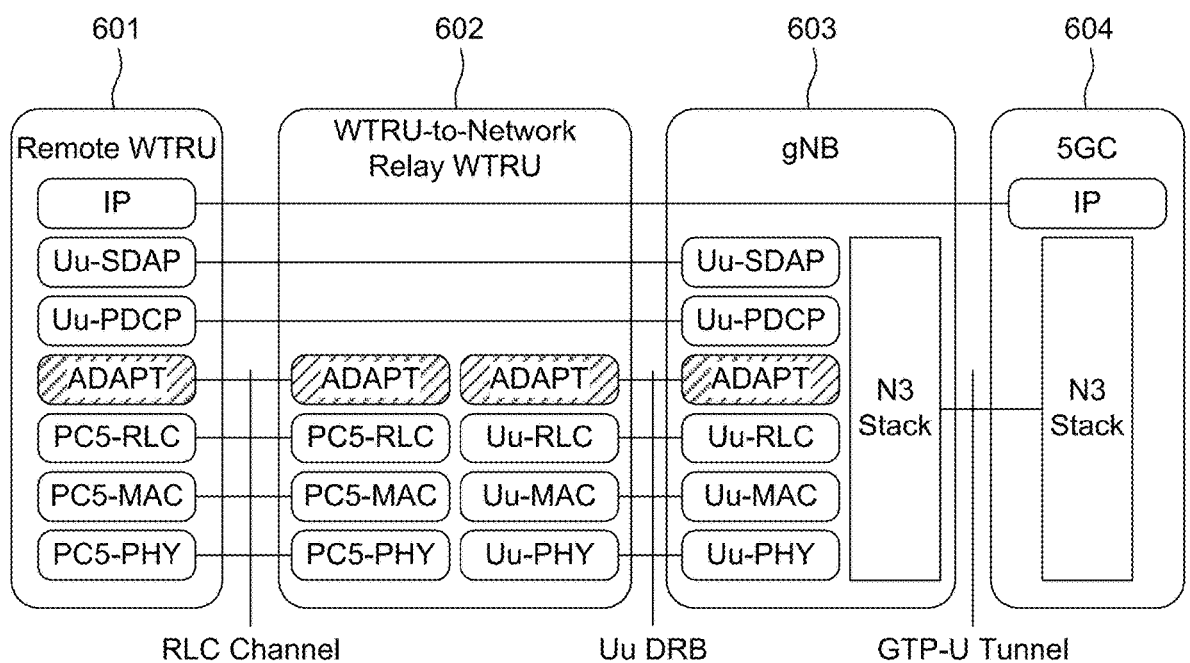
FIG. 6 illustrates an example of a user plane protocol stack for L2 WTRU-to-NW relay (adaptation layer supported at the PC5 interface)

FIG. 6 illustrates an example of a user plane protocol stack for L2 WTRU-to-NW relay (adaptation layer supported at the PC5 interface). The protocol stack may be shown across multiple entities, such as a remote WTRU at 601, a WTRU-to-NW relay at 602, an gNB at 603, and a 5GC at 604.

Figure 7:
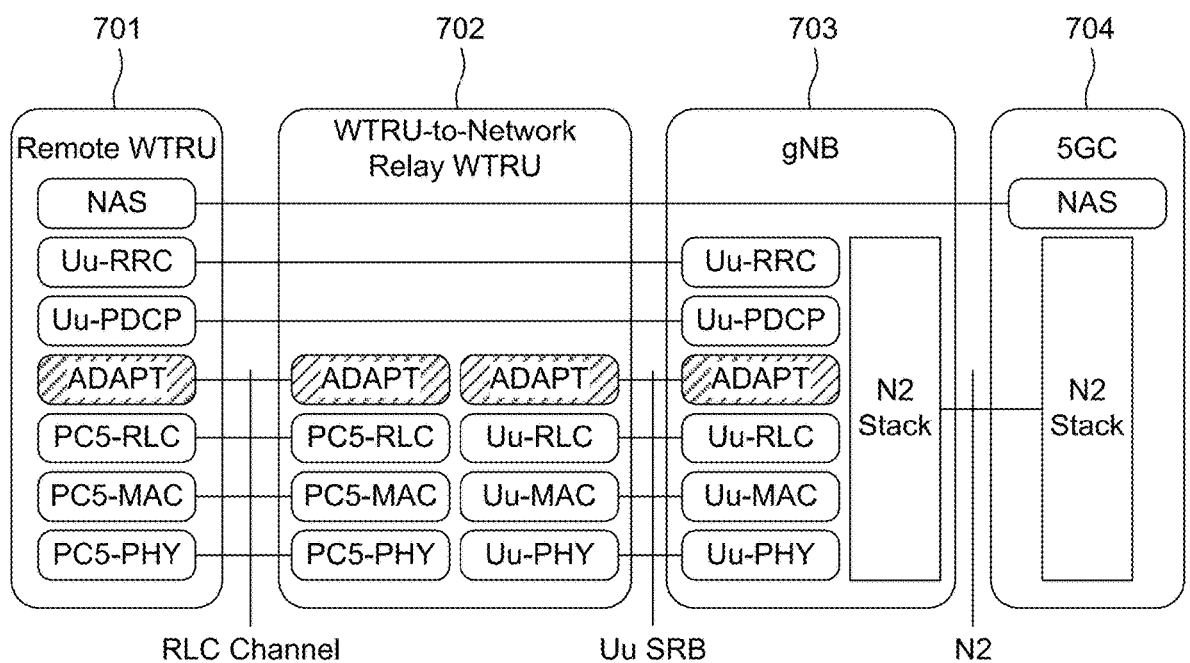
FIG. 7 illustrates an example of a control plane protocol stack for L2 WTRU-to-NW relay (adaptation layer is supported at the PC5 interface)

FIG. 7 illustrates an example of a control plane protocol stack for L2 WTRU-to-NW relay (adaptation layer is supported at the PC5 interface). The protocol stack may be shown across multiple entities, such as a remote WTRU at 701, a WTRU-to-NW relay at 702, an gNB at 703, and a 5GC at 704.

Depending on the case, the adaptation layer may, or may not, also be supported at the PC5 interface between remote WTRU and relay WTRU.

For L2 WTRU-to-NW relay, for uplink, the Uu adaptation layer at relay WTRU may support UL bearer mapping between ingress PC5 RLC channels for relaying and egress Uu RLC channels over the relay WTRU Uu path. For uplink relaying traffic, the different end-to-end RBs (SRB, DRB) of the same remote WTRU and/or different remote WTRUs may be subject to N:1 mapping and data multiplexing over one Uu RLC channel.

Also, for L2 WTRU-to-NW relay, for uplink, the Uu adaptation layer may be used to support remote WTRU identification for the UL traffic (e.g., multiplexing the data coming from multiple remote WTRU). The identity information of remote WTRU Uu Radio Bearer and remote WTRU may be included in the Uu adaptation layer at UL in order for gNB to correlate the received data packets for the specific PDCP entity associated with the right remote WTRU Uu Radio Bearer of a remote WTRU.

For L2 WTRU-to-NW relay, for downlink, the Uu adaptation layer may be used to support DL bearer mapping at gNB to map end-to-end Radio Bearer (e.g., SRB, DRB) of remote WTRU into Uu RLC channel over relay WTRU Uu path. The Uu adaptation layer may be used to support DL N:1 bearer mapping and data multiplexing between multiple end-to-end Radio Bearers (e.g., SRBs, DRBs) of a remote WTRU and/or different remote WTRUs and one Uu RLC channel over the relay WTRU Uu path.

For L2 WTRU-to-NW relay, for downlink, the Uu adaptation layer may need to support remote WTRU identification for Downlink traffic. The identity information of remote WTRU Uu Radio Bearer and the identity information of remote WTRU may need to be put into the Uu adaptation layer by gNB at DL in order for relay WTRU to map the received data packets from remote WTRU Uu Radio Bearer to its associated PC5 RLC channel.

gNB implementation may handle the QoS breakdown over Uu and PC5 for the end-to-end QoS enforcement of a particular session established between remote WTRU and network in case of L2 WTRU-to-NW relay. Details of handling in case PC5 RLC channels with different end-to-end QoS are mapped to the same Uu RLC channel may be addressed herein.

In order to ensure AS layer service continuity, in some cases L2 WTRU-to-NW relays may use a RAN2 technique regarding NR handover procedure. For example, gNB hands over the remote WTRU to a target cell or target relay WTRU, including 1) Handover preparation type of procedure between gNB and relay WTRU (if needed), 2) RRCReconfiguration to remote WTRU, remote WTRU switching to the target, and 3) Handover complete message.

The exact content of the messages (e.g., handover command) may be described herein.

Figure 8:
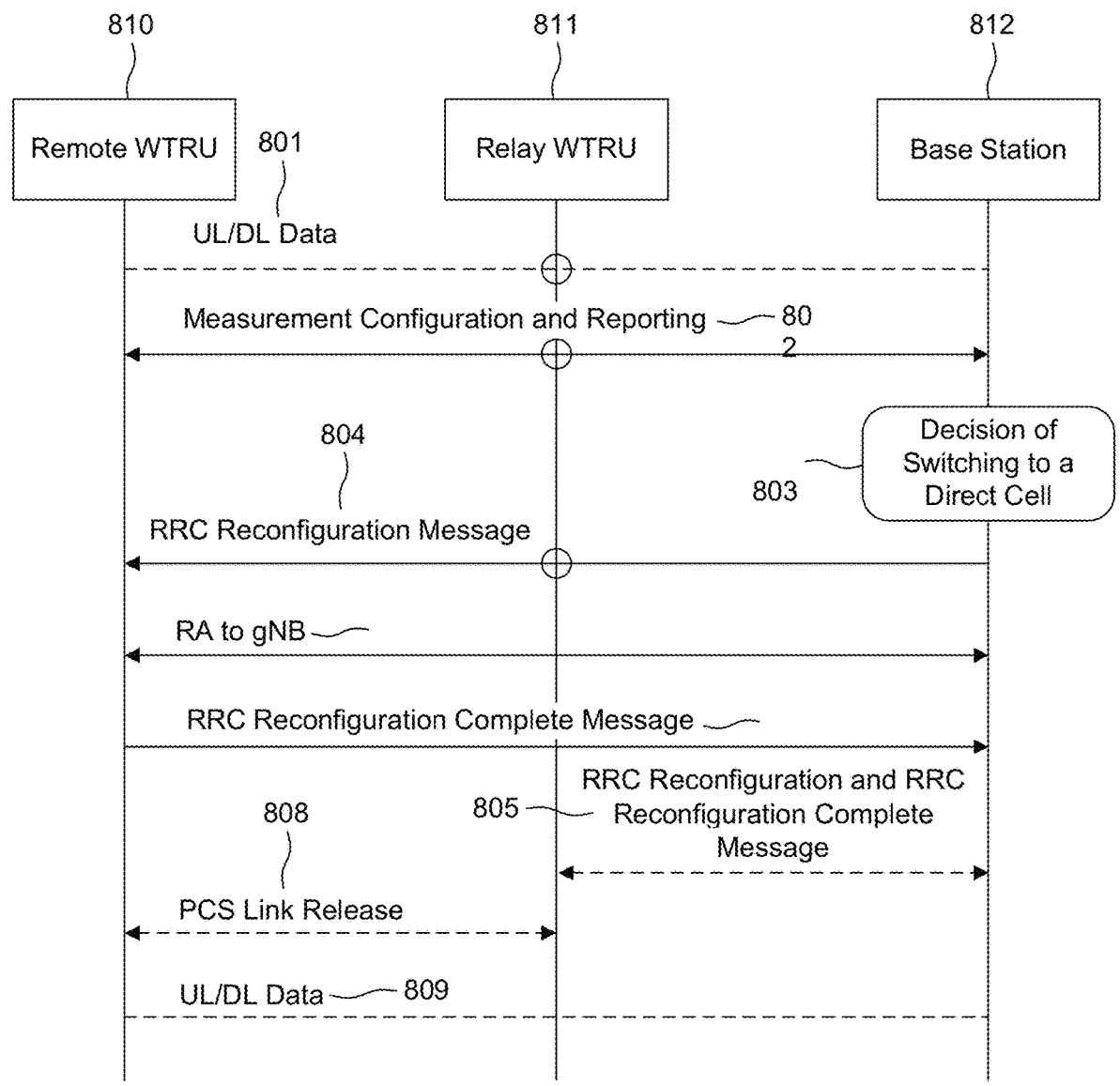
FIG. 8 illustrates an example of a procedure for remote WTRU switching to a direct Uu cell (e.g., switching from indirect to direct path)

FIG. 8 illustrates an example of a procedure for remote WTRU switching to a direct Uu cell (e.g., switching from indirect to direct path). For service continuity of L2 WTRU-to-NW relay, a baseline procedure with one or more of the following steps may be used (e.g., remote WTRU switching to direct Uu cell). Initially at 801, there is some connection between a remote WTRU 810 with a relay WTRU 811 and a base station (e.g., gNB) 812. At 802, there may be measurement configuration and reporting. At 803, the network/base station 812 may decide to switch to a direct cell (e.g., based on the measurements). At 804, the base station 812 may send an RRC reconfiguration message to the remote WTRU 810. At 805, the remote WTRU 810 may perform random access with the base station 812. At 806, the remote WTRU may send feedback, including the RRCReconfigurationComplete to the base station 812 via a target path, using the target configuration provided in the RRC reconfiguration message at 804. At 807, an RRC Reconfiguration may be sent to the relay WTRU 811. At 808, the PC5 link may be released between the remote WTRU 810 and the relay WTRU 811, if needed. At 809, the data path may be switched to resume/begin data exchange (e.g., that doesn't involve the relay, finalizing going from an indirect to a direct path). Note, the order of the example process in FIG. 8 should not be read as limiting, and may be re-ordered (e.g., 807 is before or after 804, 808 is after 804 or 806, or 809 is after 806. Further, one or more of the steps may be excluded. Additionally, in some cases the remote WTRU 810 may suspend data transmission via relay link after 804. In some cases, 808 may be replaced by PC5.

Figure 9:
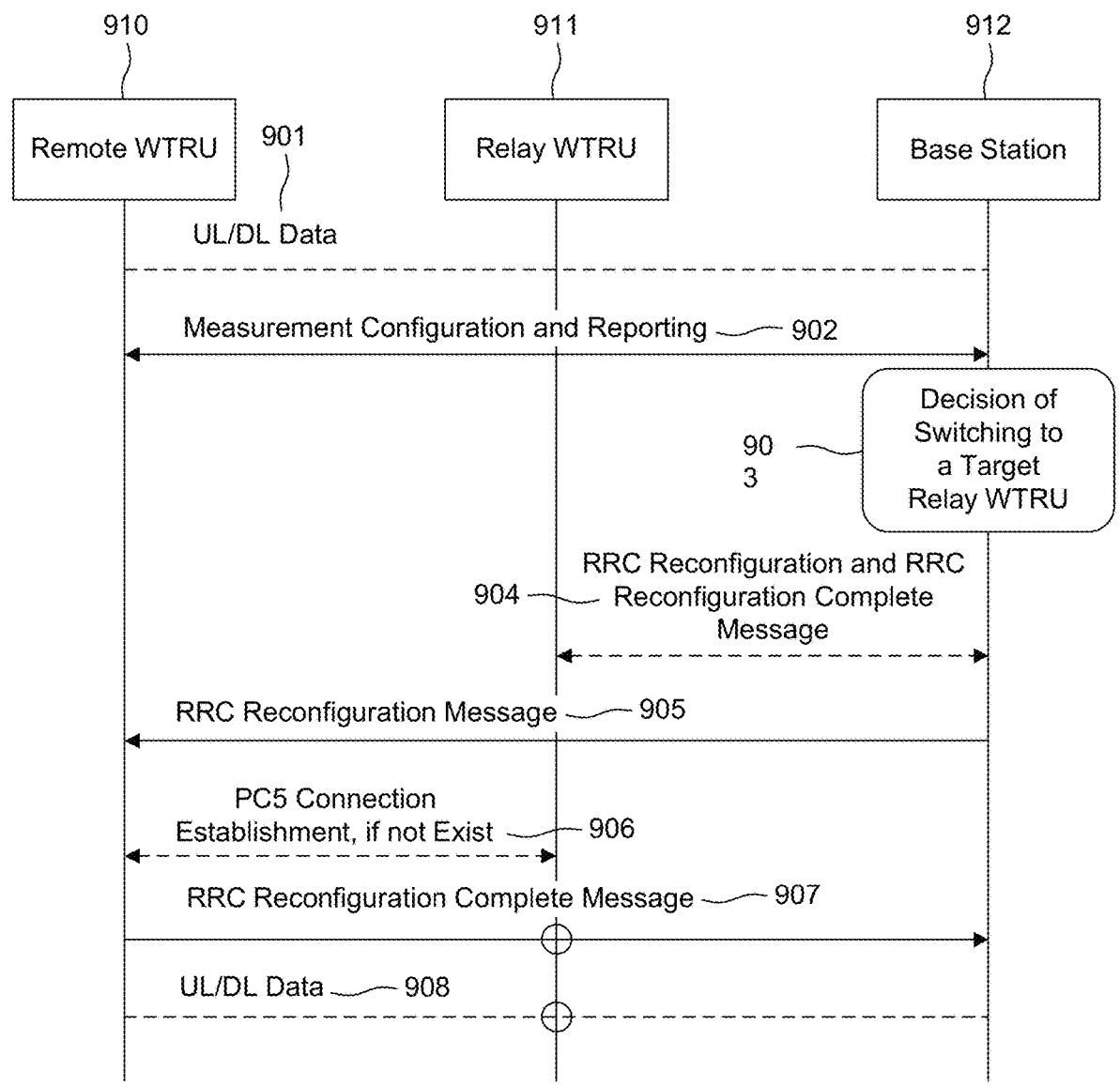
FIG. 9 illustrates an example of a procedure for remote WTRU switching to indirect relay WTRU.

FIG. 9 illustrates an example of a procedure for remote WTRU switching to indirect relay WTRU. For service continuity of L2 WTRU-to-NW relay, a baseline procedure with one or more of the following steps may be used (e.g., in case of remote WTRU switching to direct Uu cell). Initially at 901, there is some connection between a remote WTRU 910 with a relay WTRU 911 and a base station (e.g., gNB) 912. At 902, the remote WTRU 910 reports one or multiple candidate relay WTRU(s) (e.g., 911 and others), after the remote WTRU measures/discovers the candidate relay WTRU(s). In some cases, the remote WTRU 910 may filter the appropriate relay WTRU(s) meeting some criteria (e.g., provided by a higher layer) when reporting. The reporting may include the relay WTRU's ID and SL RSRP information, where such details of the measurements on PC5 may be further described herein. At 912, the network/base station 912 may decide to switch to a target relay WTRU 911, and optionally at 904 the target (re)configuration may be sent to the relay WTRU 911 (e.g., in preparation, such as RRC exchange including a configuration and a complete message). At 905, a RRC Reconfiguration message may be sent to the remote WTRU 910 from the base station 912. The following information may be included: Identity of the target relay WTRU 911; and/or, Target Uu and PC5 configuration. At 906, the remote WTRU 910 may establish PC5 connection with the target relay WTRU 911, if the connection has not been setup yet. At 907, the remote WTRU 910 may send feedback including the RRCReconfigurationComplete to the base station 912 via the target path (e.g., through the relay WTRU 911), using the target configuration provided in RRCReconfiguration. At 908, the data path switch may be completed (e.g., to an indirect from a direct). Note, the order of the process show in FIG. 9 should not be seen as limiting, and may be re-ordered. Further, one or more of the steps may be excluded. For example, 903 may be after relay WTRU 911 connects to the base station 912 (e.g., after step 906), if not yet before; and/or, 906 may be before 903, 904 or 905.

Regarding connection management, in some cases a remote WTRU needs to establish its own PDU sessions/DRBs with the network before user plane data transmission.

PC5-RRC aspects of NR V2X PC5 unicast link establishment procedures may be reused to setup a secure unicast link between remote WTRU and relay WTRU for L2 WTRU-to-NW relaying before remote WTRU establishes a Uu RRC connection with the network via relay WTRU.

For both in-coverage and out-of-coverage cases, when the remote WTRU initiates the first RRC message for its connection establishment with base station, the PC5 L2 configuration for the transmission between the remote WTRU and the WTRU-to-NW relay WTRU may be based on the RLC/MAC configuration defined in specifications.

The establishment of Uu SRB1/SRB2 and DRB of the remote WTRU may be subject to legacy Uu configuration procedures for L2 WTRU-to-NW relay.

Figure 10:
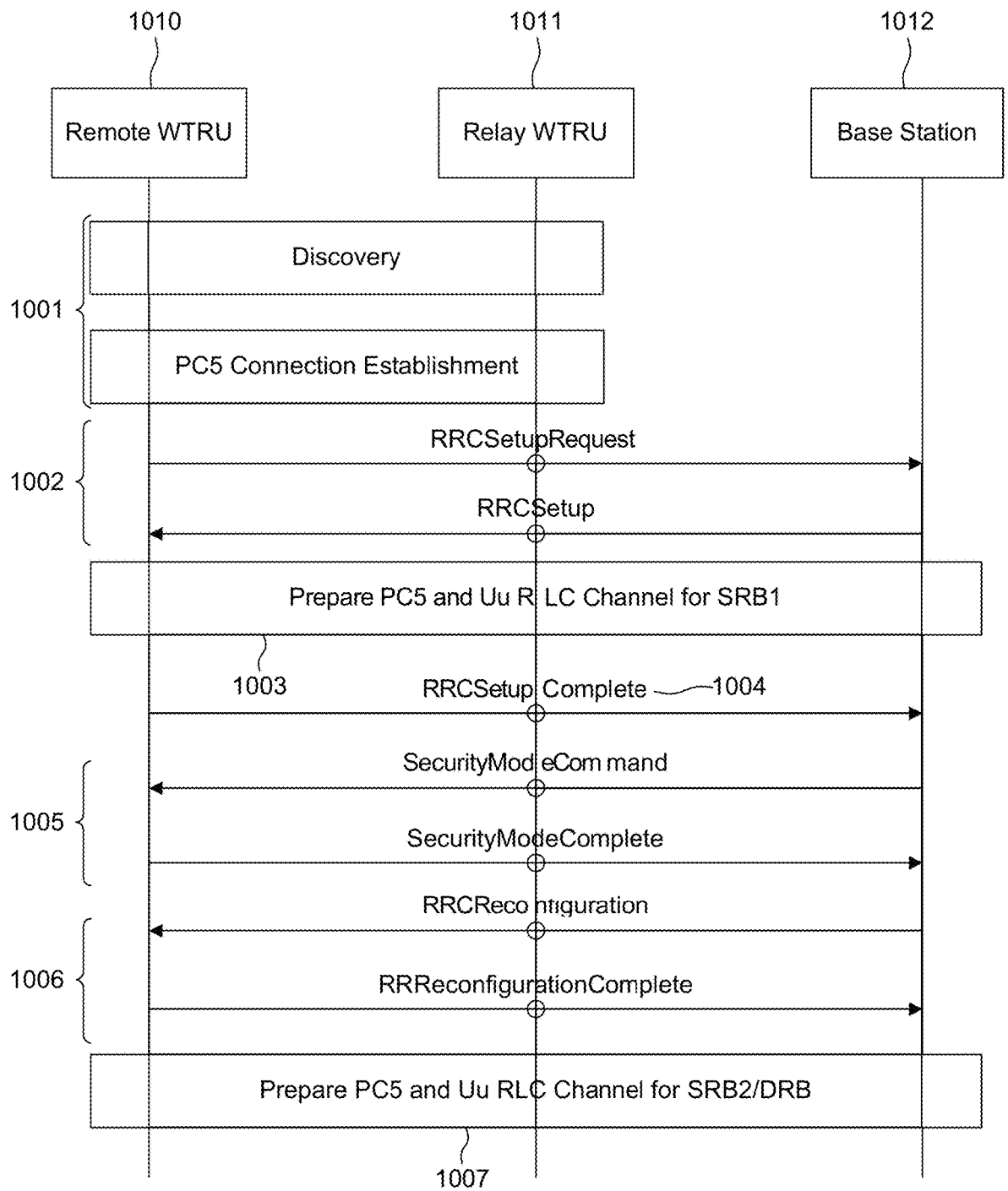
FIG. 10 illustrates an example procedure for remote WTRU connection establishment.

FIG. 10 illustrates an example procedure for remote WTRU connection establishment. This example may demonstrate a high-level connection establishment procedure, and may apply to one or more L2 WTRU-to-NW relay(s). There may be a remote WTRU 1010, a relay WTRU 1011, and a base station 1012 (e.g., gNB). At 1001 the remote WTRU 1010 and the relay WTRU 1011 may perform discovery process, and establish a PC5-RRC connection using a legacy procedure as a baseline. At 1002, the remote WTRU 1010 may send a first RRC message (e.g., RRC-SetupRequest) for its connection establishment with the base station via the relay WTRU 1011, using a default L2 configuration on PC5. The base station 1012 may respond with an RRCSetup message to the remote WTRU 1010. The RRCSetup delivery to the remote WTRU 1010 may use the default configuration on PC5. If the relay WTRU 1011 has not started in RRC_CONNECTED, it may need to do its own connection establishment as part of this process. There may be additional details for the relay WTRU 1011 to forward the RRCSetupRequest/RRCSetup message for the remote WTRU 1010 in this process not illustrated in this example, by described herein.

At 1003, the base station 1012 and relay WTRU 1011 may perform relaying channel setup process over Uu. According to the configuration from the base station 1012, the relay WTRU 1011 and/or the remote WTRU 1010 may establish an RLC channel for relaying of SRB1 towards the remote WTRU 1010 over PC5. This process may prepare the relaying channel for SRB1. At 1004, the remote WTRU 1010 SRB1 message (e.g., an RRCSetupComplete message) may be sent to the base station 1012 via the relay WTRU 1011 using SRB1 relaying channel over PC5. Then the remote WTRU 1010 may be RRC connected over Uu.

At 1005, the remote WTRU 1010 and base station 1012 may establish security following a procedure (e.g., legacy) and the security messages may be forwarded through the relay WTRU 1011. At 1006, the base station 1012 may set up additional RLC channels between the base station 1012 and relay WTRU 1011 for traffic relaying. According to the configuration from the base station 1012, the relay WTRU 1011 and/or the remote WTRU 1010 may set up additional RLC channels between the remote WTRU 1010 and relay WTRU 1011 for traffic relaying. The base station 1012 may send an RRCReconfiguration to the remote WTRU 1010 via the relay WTRU 1011, to set up the relaying SRB2/DRBs. The remote WTRU 1010 may send an RRCReconfigurationComplete to the base station 1012 via the relay WTRU 1011 as a response.

Besides the connection establishment procedure, for L2 WTRU-to-NW relay, the RRC reconfiguration and RRC connection release procedures may reuse existing RRC procedures, with the message content/configuration design beyond this example, and the RRC connection re-establishment and RRC connection resume procedures may reuse existing RRC procedure as baseline, and then add the above connection establishment procedure of L2 WTRU-to-NW relay to handle the relay specific part, with the message content/configuration design may be beyond this example.

In RRC_CONNECTED, the WTRU may measure multiple beams, at least one, of a cell and the measurements results (e.g., power values) may be averaged to derive the cell quality. In doing so, the WTRU may be configured to consider a subset of the detected beams. Filtering may take place at two different levels: at the physical layer to derive beam quality and then at the RRC level to derive cell quality from multiple beams. Cell quality from beam measurements may be derived in the same way for the serving cell(s) and for the non-serving cell(s). Measurement reports may contain the measurement results of the X best beams if the WTRU is configured to do so by the base station.

Figure 11:
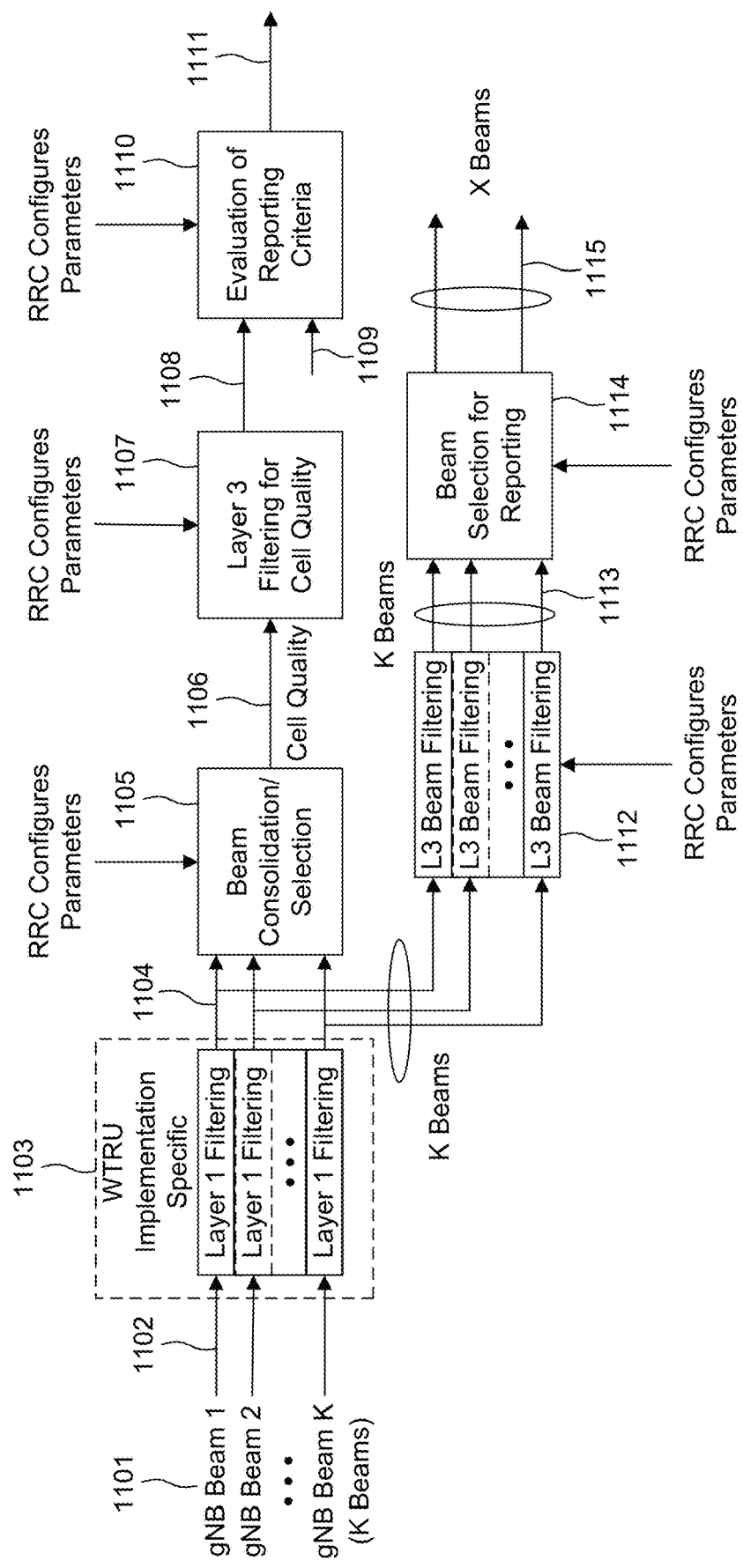
FIG. 11 illustrates an example of a high-level measurement model.

FIG. 11 illustrates an example of a high-level measurement model, which generally shows the evaluation of K beams through different stages of filtering and/or measurements for reporting. Note, K beams may correspond to the measurements on SSB and/or CSI-RS resources configured for L3 mobility by a gNB and detected by WTRU at L1. Initially at 1101, there may be K gNB beams (e.g., as observed by the WTRU). Note, any ellipses shown in any figure indicates the possibility of a plurality of something that is not illustrated for the simplicity of illustrating the concept in question. At 1102 there may be measurements (e.g., beam specific samples) internal to the physical layer of the K beams as inputs. At 1103, layer 1 filtering may be performed, which is internal layer 1 filtering of the inputs measured at 1102. Exact filtering may be implementation dependent. How the measurements are actually executed in the physical layer may be implementation specific (e.g., inputs 1102 and layer 1 filtering).

At 1104, there may be measurements (e.g., beam specific measurements) reported by layer 1 to layer 3 after layer 1 filtering. Depending on one or more factors, these 1104 measurements may undergo beam/consolidation and/or further filtering.

For example, at 1105, there may be beam consolidation and/or selection where beam specific measurements 1104 are consolidated to derive further measurements 1106 (e.g., cell quality). The behavior of the beam consolidation/selection 1105 may be standardized and the configuration of this module may be provided by RRC signaling. The 1106 measurements may be (e.g., cell quality) derived from beam-specific measurements reported to layer 3 after beam consolidation/selection 1105. In one example, the reporting period at 1106 may equal one measurement period at 1104. At 1107, layer 3 filtering for cell quality may be performed, which is filtering of the 1106 measurements. The behavior of the layer 3 filters 1107 may be standardized and the configuration of the layer 3 filters may be provided by RRC signaling. The layer 3 filtering may generate measurements 1108. In one example, the reporting rate of 1108 measurements may be the same as the reporting rate at point 1106. The 1108 measurement(s) may be used as input for one or more evaluation of reporting criteria 1110. In one example, a filtering reporting period at 1108 may by the same as one measurement period at 1106.

At 1110, the evaluation of reporting criteria may check whether actual measurement reporting 1111 is necessary. The evaluation 1110 may be based on more than one flow of measurements (e.g., to compare between different measurements). This is illustrated by input 1108 and 1109. At 1110, the WTRU may evaluate the reporting criteria at least every time a new measurement result is reported, such as with 1108 and 1109. The reporting criteria may be standardized and the configuration may be provided by RRC signaling (e.g., WTRU measurements).

The 1111 report (e.g., measurement reporting information sent in a message) may be sent on the radio interface.

In some cases, at 1112 layer 3 (L3) beam filtering may occur, which is filtering performed on the 1104 measurements (e.g., beam specific measurements). The behavior of the beam filters at 1112 may be standardized and the configuration of the beam filters may be provided by RRC signaling. The L3 filtering 1112 may generate 1113 measurement(s) (e.g., beam-specific measurement). In one example, the reporting rate of 1113 measurements may be the same to the reporting rate 1104. The measurements 1113 may be used as input for selecting 1114 X measurements to be reported (e.g., where X is smaller than K). The behavior of the beam selection 1114 may be standardized and the configuration of this module may be provided by RRC signaling.

At 1115, a measurement report may be sent on the radio interface, where the report may include beam measurement information of the X measurements selected at 1114.

Layer 1 filtering may introduce a certain level of measurement averaging. How and when the WTRU exactly performs the required measurements may be implementation specific, such as to the point that the output at B fulfils the performance requirements. Layer 3 filtering for cell quality, and related parameters, may not introduce any delay in the sample availability between points 1106 and 1108. Measurement(s) at point 1108/1109 may be the input used in the event evaluation. L3 beam filtering and related parameters may not introduce any delay in the sample availability between points 1113 and 1115.

In some cases, measurement reports may include the measurement identity of the associated measurement configuration that triggered the reporting. In some cases, cell and beam measurement quantities to be included in measurement reports may be configured by the network. In some cases, the number of non-serving cells to be reported may be limited through configuration by the network. In some cases, cells belonging to a blacklist configured by the network may not be used in event evaluation and reporting, and conversely when a whitelist is configured by the network, only the cells belonging to the whitelist may be used in event evaluation and reporting. In some cases, beam measurements to be included in measurement reports may be configured by the network (e.g., beam identifier only, measurement result and beam identifier, or no beam reporting).

SSB based intra-frequency measurement may be defined as an SSB based intra-frequency measurement provided the center frequency of the SSB of the serving cell and the center frequency of the SSB of the neighbor cell are the same, and/or the subcarrier spacing of the two SSBs may also be the same.

SSB based inter-frequency measurement may be defined as an SSB based inter-frequency measurement provided the center frequency of the SSB of the serving cell and the center frequency of the SSB of the neighbor cell are different, and/or the subcarrier spacing of the two SSBs may be different.

For SSB based measurements, one measurement object may correspond to one SSB and the WTRU may consider different SSBs as different cells.

CSI-RS based inter-frequency measurement may be defined as a CSI-RS based inter-frequency measurement if it is not a CSI-RS based intra-frequency measurement.

CSI-RS based intra-frequency measurement may be defined as a CSI-RS based intra-frequency measurement provided that: the SCS of CSI-RS resources on the neighbor cell configured for measurement is the same as the SCS of CSI-RS resources on the serving cell indicated for measurement; for SCS=60 kHz, the CP type of CSI-RS resources on the neighbor cell configured for measurement is the same as the CP type of CSI-RS resources on the serving cell indicated for measurement; and/or, the center frequency of CSI-RS resources on the neighbor cell configured for measurement is the same as the center frequency of CSI-RS resource on the serving cell indicated for measurement.

Extended CP for CSI-RS based measurement may not be supported in some cases.

Whether a measurement is non-gap-assisted or gap-assisted may depend on the capability of the WTRU, the active BWP of the WTRU, and/or the current operating frequency. For SSB based intra-frequency measurement, if the measurement gap requirement information is reported by the WTRU, a measurement gap configuration may be provided according to the information; otherwise, a measurement gap configuration may always be provided in the case where other than the initial BWP, if any of the WTRU configured BWPs do not contain the frequency domain resources of the SSB associated to the initial DL BWP. Alternatively/additionally, for SSB based inter-frequency measurement, if the measurement gap requirement information is reported by the WTRU, a measurement gap configuration may be provided according to the information; otherwise, a measurement gap configuration may always be provided in the following cases: if the WTRU only supports per-WTRU measurement gaps; and/or, if the WTRU supports per-FR measurement gaps and any of the serving cells are in the same frequency range of the measurement object.

The measurement reporting configuration may be either event triggered or periodical. If it is periodical, the WTRU sends the measurement report every reporting interval (e.g., which can range between 120 ms and 30 min).

For event triggered measurements, the WTRU sends the measurement report when the conditions associated with the event are fulfilled. The WTRU may keep on measuring serving cell and neighbor report quantity and validate it with the threshold or offset defined in the report configuration. The report quantity/the trigger for the event may be RSRP, RSRQ, and/or SINR. Specific types of events are further described herein.

In some cases (e.g., NR), there may be intra-RAT events and/or inter-RAT events. In some cases, these events may be used as triggers for one or more actions (e.g., measuring, reporting, handover, etc.)

One intra-RAT event may be an event A1 where a serving cell becomes better than a threshold. This may be used to cancel an ongoing handover procedure. This may be required if a WTRU moves towards cell edge and triggers a mobility procedure, but then subsequently moves back into good coverage before the mobility procedure has completed.

One intra-RAT event may be an event A2, where a serving becomes worse than a threshold. Since it does not involve any neighbor cell measurements, A2 may be used to trigger a blind mobility procedure, or the network may configure the WTRU for neighbor cell measurements when it receives a measurement report that is triggered due to event A2 in order to save the WTRU battery (e.g., not perform neighbor cell measurement when the serving cell quality is good enough).

One intra-RAT event may be an event A3, where a neighbor becomes offset better than a special cell (SpCell). This may be typically used for handover procedure. Note that an SpCell may be the primary serving cell of either the Master Cell Group (MCG) (e.g., the PCell), or Secondary Cell Group (SCG) (e.g., the PSCell). Thus, in DC operation, the Secondary Node (SN) may configure an A3 event for SN triggered PSCell change.

One intra-RAT event may be an event A4, where a neighbor becomes better than a threshold. This may be typically used for handover procedures which does not depend upon the coverage of the serving cell (e.g., load balancing, where the WTRU is handed over to a good neighbor cell even if the serving cell conditions are excellent).

One intra-RAT event may be an event A5, where a SpCell becomes worse than a threshold1 and a neighbor becomes better than threshold2. Like A3, this may be typically used for handover, but unlike A3, it may provide a handover triggering mechanism based upon absolute measurements of the serving and neighbor cell, while A3 uses relative comparison. As such, it may be suitable for time critical handover when the serving cell becomes weak and it is necessary to change towards another cell that may not satisfy the criteria for an event A3 handover.

One intra-RAT event may be an event A6, where a neighbor becomes offset better than a SCell. This may be used for SCell addition/releasing.

One inter-RAT event may be an event B1, where an inter-RAT neighbor becomes better than a threshold. This may be equivalent to A4, but for a case of inter-RAT handover.

One inter-RAT event may be an event B2, where a PCell becomes worse than threshold1 and an inter-RAT neighbor becomes better than threshold2. This may be equivalent to A5, but for the case of inter-RAT handover.

The WTRU's measurement configuration may contain an s-measure configuration (s-MeasureConfig), which specifies a threshold for NR SpCell RSRP measurement controlling when the WTRU is required to perform measurements on non-serving cells. The value may be a threshold corresponding to ssb-RSRP (e.g., corresponding to cell RSRP based on SS/PBCH block) or a choice of csi-RSRP (e.g., corresponding to cell RSRP of CSI-RS). If the measured SpCell SSB or CSI RSRP is above the threshold, the WTRU may not perform measurements on non-serving cells, improving WTRU power consumption (e.g., WTRU does not perform unnecessary measurements if it has very good radio conditions towards the serving cells).

Regarding measurements on sidelink relating to power control, for in-coverage operation, the power spectral density of the sidelink transmissions may be adjusted based on the pathloss from the base station. For unicast, the power spectral density of some sidelink transmissions may be adjusted based on the pathloss between the two communicating WTRUs.

For measurements on sidelink relating to CSI report(s), for unicast, channel state information reference signal (CSI-RS) may be supported for CSI measurement and reporting in sidelink. A CSI report may be carried in a sidelink MAC CE.

For measurements on the sidelink relating to physical layer measurement, the following WTRU measurement quantities may be supported: PSBCH reference signal received power (PSBCH RSRP); PSSCH reference signal received power (PSSCH-RSRP); PSCCH reference signal received power (PSCCH-RSRP); Sidelink received signal strength indicator (SL RSSI); Sidelink channel occupancy ratio (SL CR); Sidelink channel busy ratio (SL CBR).

Regarding the configuration and reporting of sidelink measurements, a WTRU may configure an associated peer WTRU to perform NR sidelink measurement and report on the corresponding PC5-RRC connection in accordance with the NR sidelink measurement configuration for unicast by RRCReconfigurationSidelink message. The NR sidelink measurement configuration may include the following parameters for a PC5-RRC connection: NR sidelink measurement objects; NR sidelink reporting configurations; NR sidelink measurement identities; and/or, NR sidelink quantity configurations.

For NR sidelink measurement objects, there may be object(s) on which the associated peer WTRU may perform the NR sidelink measurements. For NR sidelink measurement, a NR sidelink measurement object may indicate the NR sidelink frequency of reference signals to be measured.

For NR sidelink reporting configurations, there may be NR sidelink measurement reporting configuration(s) where there can be one or multiple NR sidelink reporting configurations per NR sidelink measurement object. Each NR sidelink reporting configuration may comprise of the following: Reporting criterion, where the criterion that triggers the WTRU to send a NR sidelink measurement report (e.g., either be periodical or a single event description); RS type, which may be the RS that the WTRU may uses for NR sidelink measurement results, and/or where only DMRS may be supported for NR sidelink measurement; and/or, reporting format, where there may be quantities that the WTRU includes in the measurement report, and/or only RSRP measurement may be supported.

For NR sidelink measurement identities, there may be a list of NR sidelink measurement identities where each NR sidelink measurement identity links one NR sidelink measurement object with one NR sidelink reporting configuration. By configuring multiple NR sidelink measurement identities, it may be possible to link more than one NR sidelink measurement object to the same NR sidelink reporting configuration, as well as to link more than one NR sidelink reporting configuration to the same NR sidelink measurement object. The NR sidelink measurement identity may also be included in the NR sidelink measurement report that triggered the reporting, serving as a reference to the network.

For NR sidelink quantity configurations, the NR sidelink quantity configuration may define the NR sidelink measurement filtering configuration used for all event evaluation and related reporting, and for periodical reporting of that NR sidelink measurement. In each configuration, different filter coefficients may be configured for different NR sidelink measurement quantities.

Both WTRUs of a PC5-RRC connection may maintain a NR sidelink measurement object list, a NR sidelink reporting configuration list, and/or a NR sidelink measurement identities list according to signaling and procedures as described herein.

A WTRU may derive NR sidelink measurement results by measuring one or multiple DMRS associated per PC5-RRC connection as configured by the associated peer WTRU. For all NR sidelink measurement results the WTRU may apply the layer 3 filtering before using the measured results for evaluation of reporting criteria and measurement reporting. In some cases, only NR sidelink RSRP may be configured as trigger quantity and reporting quantity.

The following measurement events may be defined for NR sidelink: Event S1, where a serving cell becomes better than a threshold; and/or, Event S2, where a serving cell becomes worse than a threshold. S1 and S2 based measurement (e.g., reports) may be used by the WTRU receiving the report to adjust the power level when transmitting data.

TABLE 1

| | |
|---|---|
| SL-ReportConfigList-r16 : : = OF SL-ReportConfigInfo-r16 | SEQUENCE (SIZE (1. . maxNrofSL-ReportConfigId-r16)) |
| SL-ReportConfigInfo-r16 : : =<br>    sl-ReportConfigId-r16<br>    sl-ReportConfig-r16<br>    . . .<br>} | SEQUENCE {<br>    SL-ReportConfigId-r16,<br>    SL-ReportConfig-r16, |
| SL-ReportConfigId-r16 : : = | INTEGER (1. . maxNrofSL-ReportConfigId-r16) |
| SL-ReportConfig-r16 : : =<br>    sl-ReportType-r16<br>        sl-Periodical-r16<br>        sl-EventTriggered-r16<br>        . . .<br>    },<br>    . . .<br>} | SEQUENCE {<br>    CHOICE {<br>        SL-PeriodicalReportConfig-r16,<br>        SL-EventTriggerConfig-r16, |
| SL-PeriodicalReportConfig-r16 : : =<br>    sl-ReportInterval-r16<br>    sl-ReportAmount-r16<br>infinity},<br>    sl-ReportQuantity-r16<br>    sl-RS-Type-r16<br>    . . .<br>} | SEQUENCE {<br>    ReportInterval,<br>    ENUMERATED {r1, r2, r4, r8, r16, r32, r64,<br><br>    SL-MeasReportQuantity-r16,<br>    SL-RS-Type-r16, |

TABLE 1-continued

```
SL-EventTriggerConfig-r16 ::=           SEQUENCE {
    sl-EventId-r16                          CHOICE {
        eventS1-r16                             SEQUENCE {
            s1-Threshold-r16                        SL-MeasTriggerQuantity-r16,
            sl-ReportOnLeave-r16                    BOOLEAN,
            sl-Hysteresis-r16                       Hysteresis,
            sl-TimeToTrigger-r16                    TimeToTrigger,
            . . .
        },
        eventS2-r16                             SEQUENCE {
            s2-Threshold-r16                        SL-MeasTriggerQuantity-r16,
            sl-ReportOnLeave-r16                    BOOLEAN,
            sl-Hysteresis-r16                       Hysteresis,
            sl-TimeToTrigger-r16                    TimeToTrigger,
            . . .
        },
        . . .
    },
    sl-ReportInterval-r16                   ReportInterval,
    sl-ReportAmount-r16                     ENUMERATED {r1, r2, r4, r8, r16, r32, r64,
infinity},
    sl-ReportQuantity-r16                   SL-MeasReportQuantity-r16,
    sl-RS-Type-r16                          SL-RS-Type-r16,
    . . .
}
SL-MeasReportQuantity-r16 ::=           CHOICE {
    sl-RSRP-r16                             RSRP-Range,
    . . .
}
SL-MeasTriggerQuantity-r16 ::=          CHOICE {
    sl-RSRP-r16                             RSRP-Range,
    . . .
}
SL-RS-Type-r16 ::=                      ENUMERATED {dmrs, spare3, spare2, spare1}
-- TAG-SL-REPORTCONFIGLIST-STOP
-- ASN1STOP
```

Table 1 illustrates an example of information elements relating to sidelink reporting. Note, the ReportInterval and ReportAmount elements under EventTriggerConfig, which are discussed further herein.

TABLE 2

```
-       VarMeasReportListSL
The UE variable VarMeasReportListSL includes information about the NR
sidelink measurements for which the triggering conditions have been met.
                        VarMeasReportListSL UE variable
-- ASN1START
-- TAG-VARMEASREPORTLISTSL-START
VarMeasReportListSL-r16 ::=             SEQUENCE (SIZE
(1 .. maxNrofSL-MeasId-r16)) OF VarMeasReportSL-r16
VarMeasReportSL-r16 ::=                 SEQUENCE {
    -- List of NR sidelink measurement that have been triggered
    sl-MeasId-r16                           SL-MeasId-r16,
    sl-FrequencyTriggeredList-r16           SEQUENCE (SIZE
(1 .. maxNrofFreqSL-r16)) OF ARFCN-ValueNR      OPTIONAL,
    sl-NumberOfReportsSent-r16              INTEGER
}
-- TAG-VARMEASREPORTLISTSL-STOP
-- ASN1STOP
```

Table 2 illustrates an example of information elements with an emphasis on VarMeasReportListSL. The WTRU variable VarMeasReportListSL may include information about the NR sidelink measurements for which the triggering conditions have been met.

With respect to Table 1 and Table 2, there may be information elements (e.g., provided to the WTRU) that provide configuration information concerning measuring and reporting. For example, sl-ReportAmount may be a number of sidelink measurement reports applicable for sl-EventTriggered report type; sl-ReportInterval may indicate the interval between periodical reports (e.g., when sl-ReportAmount exceeds 1) for sl-EventTriggered report type. In some case, these information elements may convey the number of reports for amount and the time between reports for interval.

NR sidelink transmissions may have the following two modes of resource allocations: Mode 1, where sidelink resources are scheduled by a base station; and Mode 2, where the WTRU autonomously selects sidelink resources from a (pre-) configured sidelink resource pool(s) based on the channel sensing mechanism. For an in-coverage WTRU, WTRUs may be configured to operate in Mode 1 or Mode 2. For an out-of-coverage WTRU, only Mode 2 may be adopted.

To enhance QoS of NR sidelink transmissions, congestion control may be important (especially in Mode 2) to prevent a transmitting WTRU from occupying too many resources in sidelink transmissions. Two metrices may be defined for this purpose: Channel Busy Ratio (CBR), where the CBR is defined as the portion of subchannels whose RSSI exceeds a preconfigured value over a certain time duration; and Channel Occupation Ratio (CR), which considering a particular slot n, the CR may be defined as (X+Y)M, where X is the number of the subchannels that have been occupied by a transmitting WTRU within [n−a, n−1], Y is the number of the subchannels that have been granted within [n, n+b], and M is the total number of subchannels within [n−a, n+b].

For congestion control, an upper bound of CR denoted by $CR_{limit}$ may be imposed to a transmitting WTRU, where $CR_{limit}$ is a function of CBR and the priority of the sidelink transmissions. The amount of resources occupied by a transmitting WTRU may not exceed $CR_{limit}$.

The CBR report may also be used by the base station to determine the pool of resources allocated to sidelink communication (e.g., increase the pool of resources if the WTRUs involved in sidelink communication are reporting high CBRs, decrease the pool of resources if the CBRs reported are low, etc.).

In addition to peer WTRUs involved in sidelink operation configuring each other for measurement (e.g., either periodical or S1/S2 events), for in coverage operation (e.g., the remote WTRU is within the coverage of the base station), the base station may configure the remote WTRU with CBR measurements, which may also be either periodical or event triggered. The following two measurement events can be configured for CBR measurement reporting: Event C1 (CBR of NR sidelink communication becomes better than absolute threshold); and Event C2 (CBR of NR sidelink communication becomes worse than absolute threshold).

As discussed herein, NR sidelink measurements may be configured either by the peer WTRU (e.g., concerning SL-RSRP, which can be periodical or S1/S2 event triggered) or by the base station (e.g., gNB) (e.g., concerning CBR, which can be periodical or C1/C2 triggered).

In some cases, issues may arise where a base station is not aware of serving/candidate sidelink radio conditions. In some instances, the only sidelink related measurements that the base station receives may be CBR related from the perspective of the base station, which may be beneficial for congestion control and increasing/decreasing the resource pool associated with sidelink communication accordingly, but handover decisions by the base station (e.g., indirect to direct handover of the remote WTRU) may benefit from additional information. Enhancements may be required to enable the base station to become aware of the radio conditions on the sidelink between the remote WTRU and relay WTRU.

In case the WTRU is not connected to sidelink, in some instances relay link selection, and eventual establishment, may be performed if the measured sidelink RSRP is above a certain threshold. This threshold may be configured by the network (e.g., for in coverage) or pre-configuration (e.g., for out of coverage). Such measurements may also be not available at the base station.

Without the base station being aware of the sidelink measurements (e.g., serving sidelink or candidate sidelinks), only the WTRU based decisions may be made for performing mobility of a WTRU that involves a sidelink (e.g., direct to indirect, indirect to direct, or indirect to indirect), where these decisions could benefit from additional information (e.g., link measurements at the remote WTRU).

In some cases, there may be issues when attempting to compare sidelink and Uu radio, and sidelink and sidelink radio conditions. For base station controlled handover of the remote WTRU (e.g., direct to indirect or indirect to direct), there is a need for approaches/techniques that may be used to configure the WTRU to report measurements based on comparison of the radio conditions on the serving sidelink and the candidate Uu link (e.g., for indirect to direct HO) or the serving Uu link and candidate sidelink (e.g., for direct to indirect HO). Without such techniques, only load balancing like handover (e.g., direct to indirect handover based on A2 event) may be possible, and thus service continuity during mobility via proper measurements that consider both the sidelink and Uu link may not be possible.

Similarly, for base station controlled handover of the remote WTRU (e.g., indirect to indirect), there is a need for approaches/techniques that can be used to configure the WTRU to report measurements based on comparison of the radio conditions on the serving sidelink and candidate sidelink (e.g., as S1/S2 based measurements may consider only absolute threshold comparison of the serving sidelink's radio quality). Without such approaches/techniques, the only way to perform indirect to indirect handover may be an inefficient mechanism where the connection to the serving relay WTRU is determined to be not good enough based on S2 measurements (or periodic measurements on the SL-RSRP), and then discovery operation to find a better sidelink relay, and handover to that one. As described herein, there may be one or more techniques (e.g., systems, methods, and devices) for addressing measurement reporting relating to sidelink operation. These techniques may address one or more of the issues that may arise in a relay scenario (e.g., such as those issues identified herein).

Figure 12:
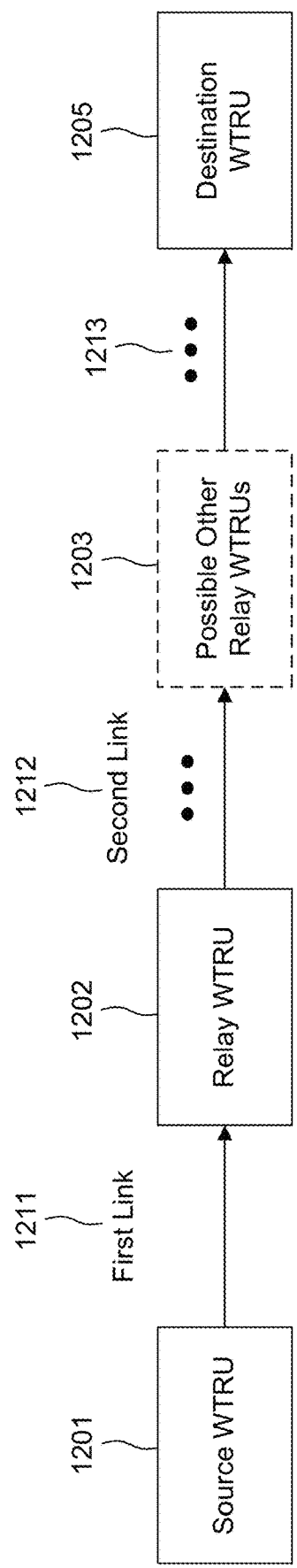
FIG. 12 illustrates an example of a WTRU-to-WTRU relay.
Figure 13:
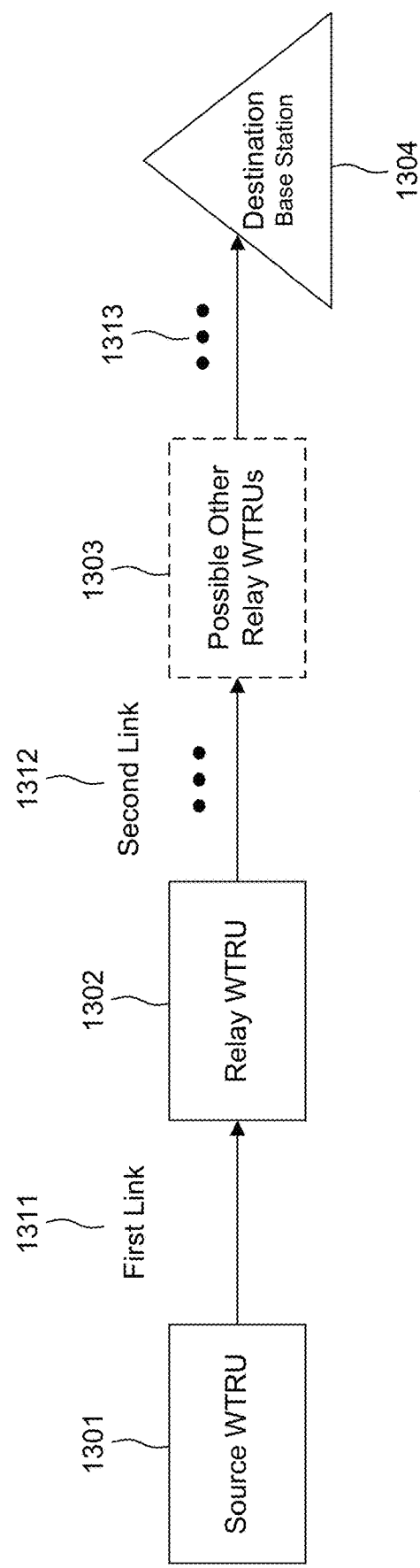
FIG. 13 illustrates an example of a WTRU-to-NW relay.

As discussed herein, a relay WTRU may be used as either a WTRU-to-WTRU relay (shown in FIG. 12) or a WTRU-to-NW relay (e.g., shown in FIG. 13). While some examples discussed herein may discuss a specific relay scenario, these examples are not intended to limiting, and the techniques described with respect to each example are intended to be interchangeable between examples where applicable.

FIG. 12 illustrates an example of a WTRU-to-WTRU relay and FIG. 13 illustrates an example of a WTRU-to-NW relay. Generally, for any relayed communication there is a source WTRU (1201, 1301) one or more relays (e.g., relay WTRU 1202/1302 and/or other possible relays 1203/1303), and a destination, such as a WTRU 1204 and/or a base station 1504. As shown in the example of FIG. 12, the first link 1211/1311 corresponds to the link between the source WTRU 1201/1301, also known as the remote WTRU, and the relay WTRU 1202/1302. The second link 1212/1312 refers to the link between the relay WTRU 1202/1302 and any of the: the destination (e.g., 1204/1304), where destination herein may be a WTRU or a network node, depending on whether the relay is a WTRU-to-WTRU relay or a WTRU-to-NW relay; and/or, the next hop WTRU (e.g., 1203/1303) in a multi-hop WTRU-to-WTRU or WTRU-to-NW link. As disclosed herein, a source WTRU may also by interchangeable to a relay WTRU being served by another relay along the link to a destination.

In some cases, a relay WTRU may be an integrated access and backhaul (IAB) node, which comprises two parts: a distributed unit (DU) of the base station that is connected to the remote/source WTRU, and a mobile termination (MT) part that is used to connected to another relay WTRU (e.g., in case of multi-hop scenario) or a donor DU of the base station (e.g., in case of one hop scenario).

Figure 14:
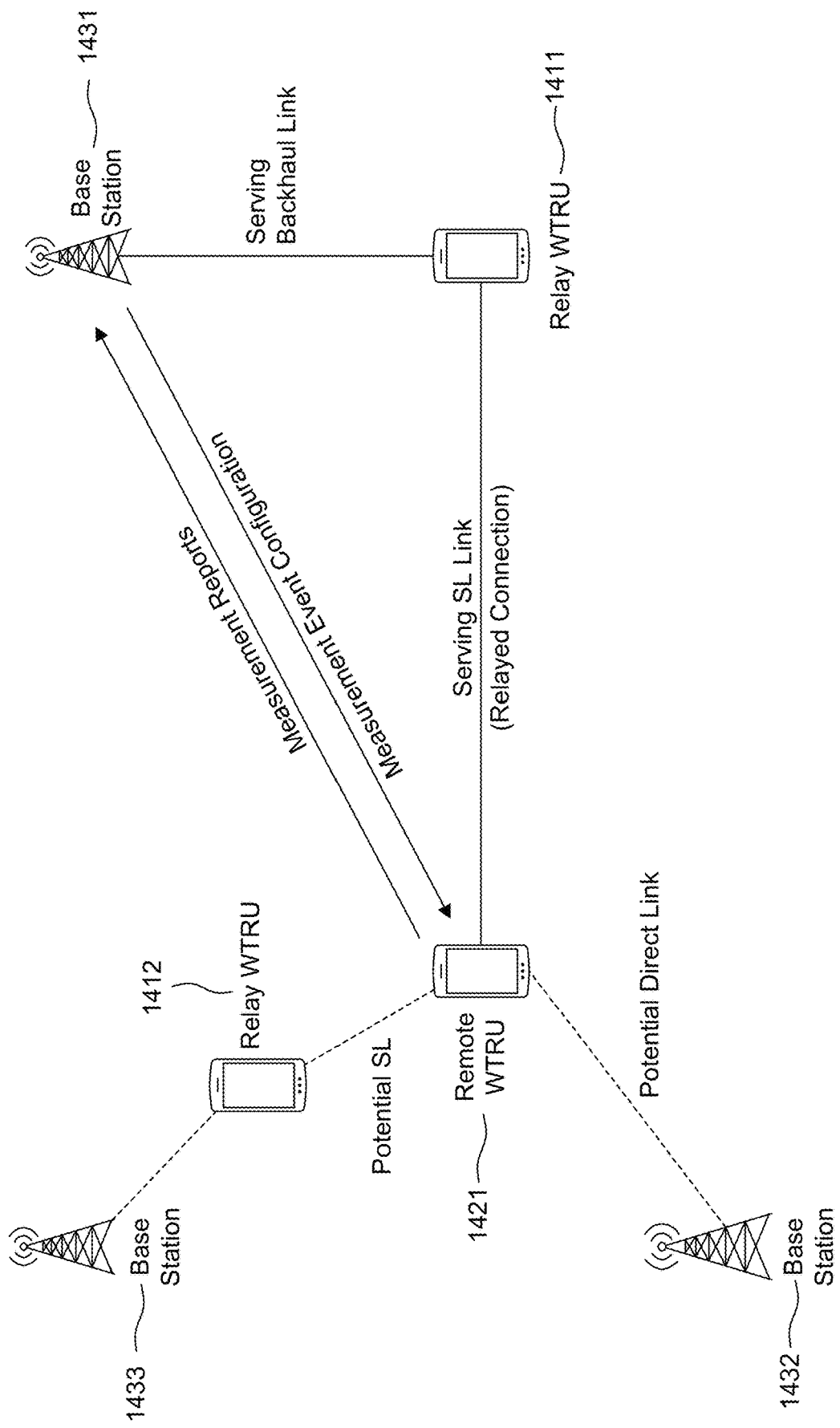
FIG. 14 illustrates an example of a WTRU relay environment where measurements/reporting may be performed.

FIG. 14 illustrates an example relay scenario where measurements and reporting may be considered. Similar to the example of FIG. 13, a WTRU-to-Network relay is shown, however, this illustration is intended to be similarly applicable to WTRU-to-WTRU relays. In a given relay scenario, there may be a remote WTRU 1421 that establishes and/or has a serving sidelink to a relay WTRU 1411, which in turn acts as a relay to a destination of a base station (e.g., gNB) 1431 through a serving backhaul link. One possibility for this relay is to send measurement event configuration from the base station 1431 to the remote WTRU 1421, and send measurements reports from the remote WTRU 1421 to the base station 1431. The remote WTRU 1421 may be required to measure and report on any and/or all links within a given area. For instance, a measurement may perform on a potential direct link to 1432 base station, a potential sidelink with another relay WTRU 1412, which in turn would connect to base station 1433, and/or the existing links it has of the serving sidelink with relay WTRU 1411. One general concept that may be understood from FIG. 14 is that from the perspective of a given WTRU (e.g., the remote WTRU 1421), there is a need to measure and report any/all links that currently or could exist in a given wireless environment (e.g., through the normal course of operation where the WTRU may be mobile at some points and may be stationary at other points).

In one or more of the examples provided herein where the WTRU is connected via a sidelink, any measurements taken/configured may refer to the sidelink measurements towards the relay WTRU; however, these examples are not intended to be limiting, and may be equally applicable to situations for measurements of candidate sidelinks or other candidate direct links (e.g., a WTRU directly connected to the base station measuring sidelinks to candidate relay WTRUs for the case of direct to indirect mobility, or a remote WTRU that is already connected to a relay WTRU measuring sidelinks to candidate relay WTRUs for the case of indirect to indirect mobility). Further, while one or more examples provided herein recite scenarios from involving a WTRU-to-Network relay, these examples are not intended to be limiting, and may be equally applicable to situations with WTRU-to-WTRU relays (e.g., where the destination base station or WTRU makes the decision and provides the configuration information to the remote WTRU).

Generally, for measuring/reporting in a relay WTRU scenario (e.g., FIG. 14), as may be applicable to any example herein, a remote WTRU may be configured by a relay WTRU or a base station (e.g., through the relay or directly) to perform measurements (e.g., sidelink or direct link), and the remote WTRU may report the measurements, either periodically or on S1/S2 like events to the relay WTRU or the base station, or both, depending on the configuration (e.g., sidelink relay or direct link with the base station); where the reporting may be based on one or more conditions as defined herein. The reporting of the sidelink measurement to the base station may be performed in a periodic or/and event-based manner. Once the base station has the report of the measurement, it can then evaluate the information alone or in combination with other measurements, and make decisions on coverage management related to the remote WTRU (e.g., handover).

An IE may be included in the reporting configuration (e.g., SL-ReportConfigInfo IE) that specifies where the report is to be sent for all measurements. An IE may be included in the SL-ReportConfig IE that specifies where the report is to be sent for the measurement associated with that particular reporting configuration. If both IEs are present, the IE within SL-ReportConfig may take precedence. The remote WTRU may communicate the reporting configuration to the base station (e.g., thresholds in case it is event triggered reporting, frequency information, etc.) so that the base station can understand the SL measurement results when it gets the reports from the remote WTRU. Some or parts of the sidelink measurement configuration (e.g., thresholds, reporting intervals, etc.) may be decided by the base station and sent to the relay WTRU, which then configures the remote WTRU accordingly.

A relay WTRU may configure the remote WTRU to perform measurements based on one or more conditions. Alternatively, or in addition to this, a remote WTRU may decide whether to report measurements to the base station or the relay WTRU or both, based on one or more conditions. Such conditions may be any of the conditions discussed herein.

A remote WTRU, when reporting measurements to the relay WTRU, may use SL RRC message. A remote WTRU, when reporting measurements to the network, may use Uu RRC message. A remote WTRU may report to both network and relay WTRU using two separate RRC messages on different interfaces. Alternatively, a remote WTRU may use a single RRC message where applicable parts of that message may be interpreted by both the base station and the relay WTRU.

Figure 15:
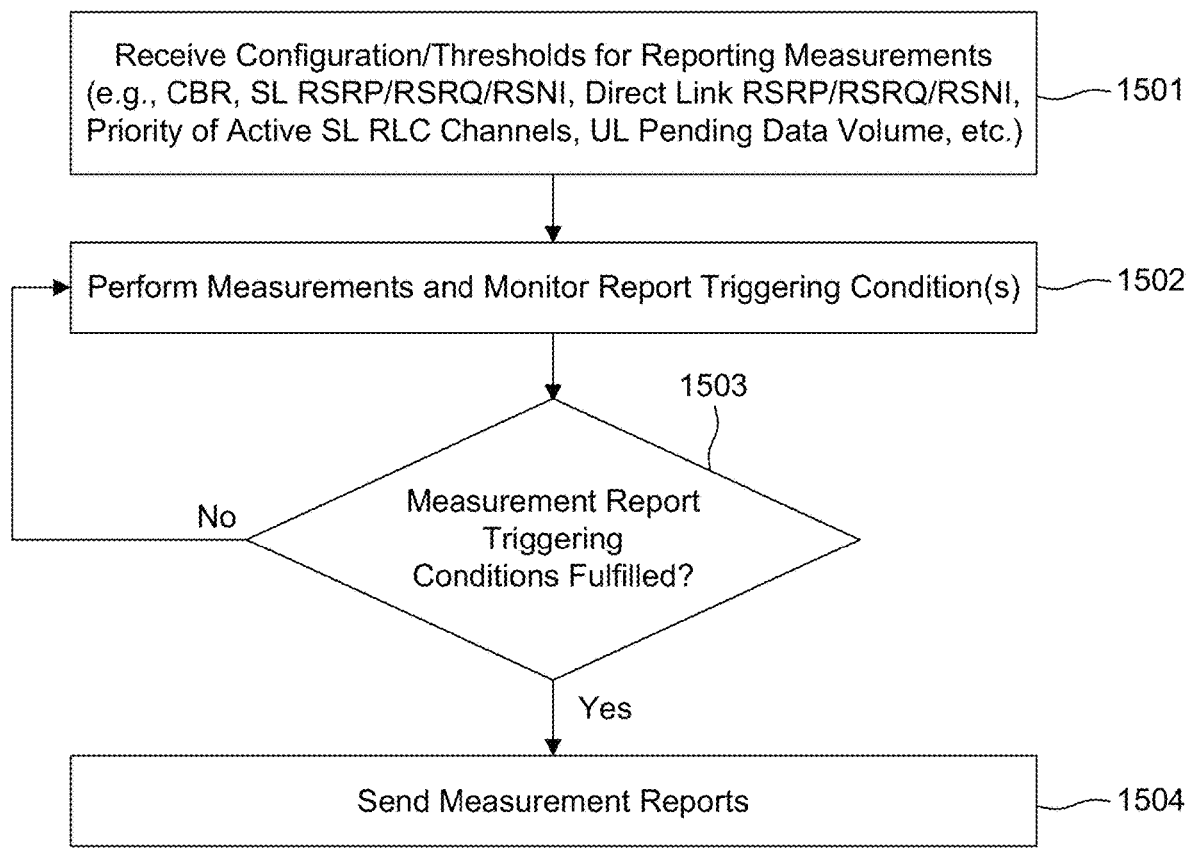
FIG. 15 illustrates an example of a measurements/reporting method

FIG. 15 illustrates a general example of measuring/reporting for a relay scenario. At 1501, a WTRU may receive configuration information, where the configuration information may include thresholds/conditions for taking and/or reporting measurements. These measurements and/or thresholds may include one or more of the following: CBR, SL RSRP, SL RSRQ, SL RSNI, direct link RSRP, direct link RSRQ, direct link RSNI, priority of active SL RLC channels, UL pending data volume, etc.). At 1502, the WTRU may perform measurements on one or more active and/or potential links. At 1503, the WTRU may assess the measurements to determine whether one or more thresholds is met (e.g., above, below, exact match, within a range, etc.). If one or more thresholds is met, and/or one or more events occur (e.g., any event described herein), this may trigger an action, such as reporting (e.g., depending on periodicity configurations), at which point the measurements may be sent at 1504; otherwise, if the threshold(s) is not met, the measuring and/or analysis of the thresholds may continue until a threshold is met, new configuration is received, or some other related function the WTRU may take. The frequency of the measuring/analysis may be configured, as discussed further herein. Alternatively, or in addition to reporting, in some cases the thresholds may trigger an action that may be related to a handover. In some cases, in response to sending the reporting, the WTRU may receive a handover related command.

In one instance applicable to any example described herein, after the base station receives the report, the base station may then send instructions to the remote WTRU, such as hand over related instructions (e.g., cancel handover, continue handover, start handover, etc.). Handover may apply to one or more links of a WTRU, or all links of a WTRU (e.g., dual connectivity, where a secondary link is added/removed/changed). In one instance applicable to any example described herein, when one or thresholds are met, instead of sending a report, the WTRU may be triggered to perform a handover that the base station previously provided instructions for (directly or through a relay) in the configuration information or in a handover command with a trigger mechanism (e.g., conditional handover).

In one example, the remote WTRU may be configured by the base station to perform sidelink measurements, and the remote WTRU reports the measurements (e.g., either periodically or on S1/S2 like events) to the relay WTRU, the base station, or both, depending on the configuration. The reporting of the sidelink measurement to the base station may be performed in a periodic and/or event-based manner.

The sidelink measurement configuration provided by the base station may be based on the existing message/information structure for legacy sidelink measurement/reporting configurations by the peer WTRU (e.g., SL-ReportConfigInfo, SL-ReportConfig, etc. and associated S1/S2 events), or it may be based on the existing message/information structure for legacy Uu measurement (e.g., MeasObjectNR, ReportConfigNR, etc. and associated A1/A2 events). In the latter case, the legacy Uu measurement/reporting configuration may be enhanced to also include sidelink measurement/reporting configuration.

Generally, the WTRU may have different configurations with regard to the measurements to be reported to the base station as compared to the measurements to be reported to the relay WTRU, even if they are provided in a single message for measurement and reporting configuration (e.g., RRC configuration information message, with several information elements). For example, there may be: different reporting intervals (e.g., reporting more frequently to the relay as compared to the base station, or vice versa); different triggering thresholds (e.g., lower S1 threshold for the report to the relay as compared to the report to the base station or vice versa, higher S2 threshold for the report to the relay as compared to the report to the base station or vice versa, etc.); and/or, different hysteresis or timer to trigger values (e.g., longer time to trigger for the report to the base station as compared to the report to the relay, as the decision made by the base station based on the reports (e.g., handover related decisions) may be considered more critical than that of the report to the relay WTRU, as that is used for power control).

A combination of more than one approach is also possible. For example, the WTRU may be configured independently to perform/report sidelink measurements by the base station (e.g., second approach) and the relay WTRU (e.g., first approach), and performs and reports the measurements to the base station and relay WTRU according to each configuration.

Figure 16:
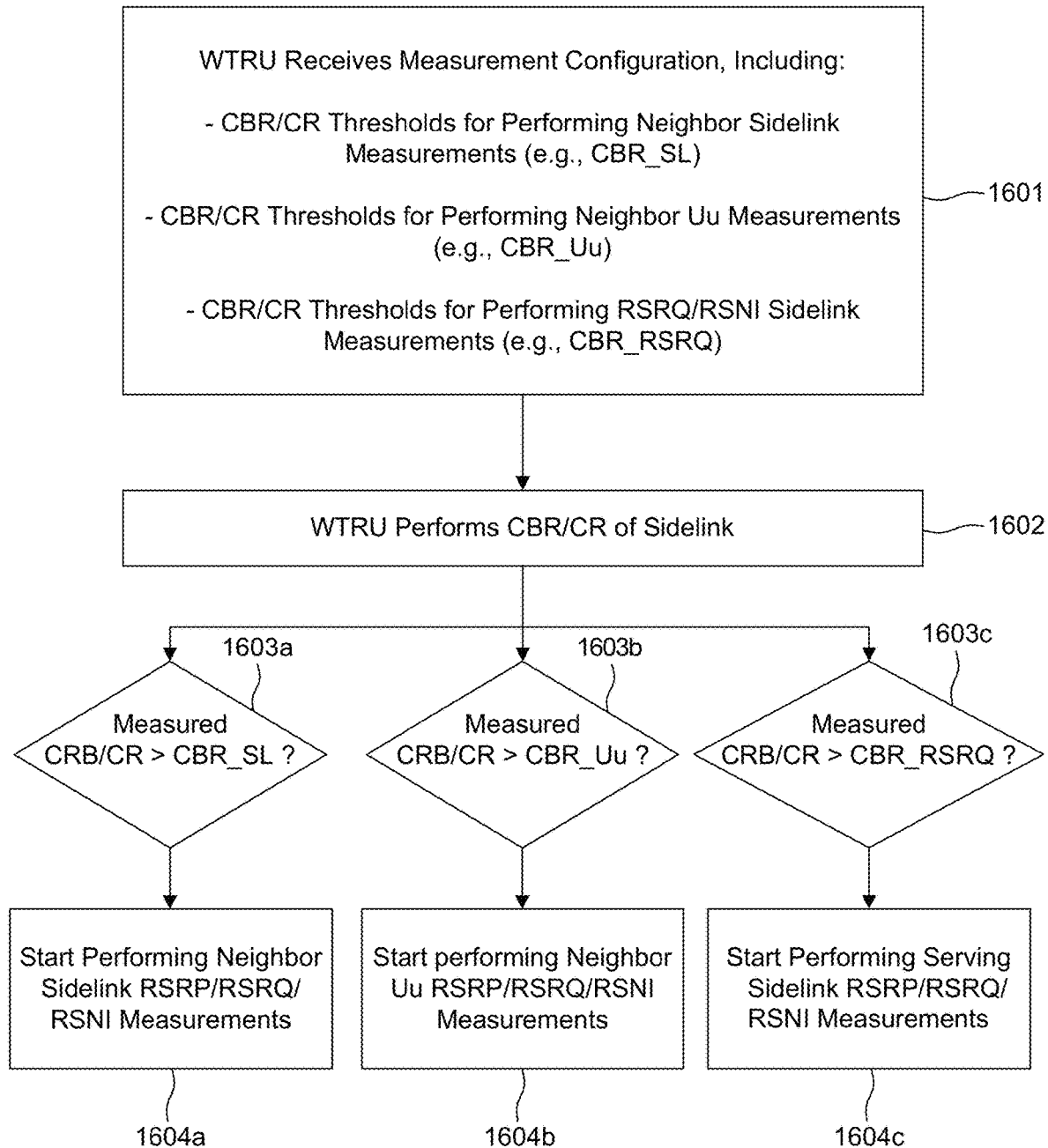
FIG. 16 illustrates an example of a measurements/reporting method.

FIG. 16 illustrates an example where CBR/CR related measurements may be used to determine when/whether the remote WTRU performs SL-RSRP/RSRQ/RSNI measurements. Generally, CBR/CR related measurements may be used to determine when/whether the remote WTRU performs SL-RSRP/RSRQ/RSNI measurements. This may help in avoiding unnecessary neighbor measurements, and thereby conserve WTRU battery, when there is no congestion in the sidelink. The WTRU may be configured to perform neighbor sidelink measurements only when the CBR/CR on the sidelink is above a certain threshold. The WTRU may be configured to perform neighbor Uu measurements only when the CBR/CR on the sidelink is above a certain threshold, where the threshold may be the same or different from the CBR/CR threshold to enable neighbor sidelink measurements. The WTRU may be configured to perform neighbor sidelink or neighbor Uu measurements only when the CBR/CR on the sidelink is above a certain threshold and the SL-RSRP/RSRQ/RSNI measurements are below a certain threshold. The WTRU may be configured to perform serving SL-RSRQ/RSNI measurements only when the CBR/CR is above a certain threshold. For example, if the CBR/CR threshold is below the threshold, the WTRU may only perform SL-RSRP measurements that will be used by the relay WTRU for power control, when the CBR/CR is above the threshold, the WTRU may start performing SL-RSRQ measurements that will be used by the base station for mobility decisions.

As shown in the example of FIG. 16, at 1601 the WTRU may receive configuration information relating to measurements/reporting. This configuration information may include one or more of the following: CBR/CR thresholds for performing neighbor sidelink measurements, such as CBR_SL; CBR/CR thresholds for performing neighbor Uu measurements, such as CBR_Uu; CBR/CR thresholds for performing RSRQ/RSNI sidelink measurements, such as CBR_RSRQ; and/or, other related measurements, such as those disclosed herein. At 1602, the WTRU may perform CBR/CR measurements of one or more sidelinks. Next, at 1603 (1603a, 1603b, 1603c) depending on the measurement results relative to the thresholds received earlier, the WTRU may perform additional measurements of neighbor sidelink RSRP/RSRQ/RSNI at 1604 (1604a, 1604b, 1604c). In some cases, the WTRU may selective perform the measurements/ assessments of 1602, 1603, and/or 1603, depending on the configuration, even though all are shown in the example of FIG. 16.

Figure 17:
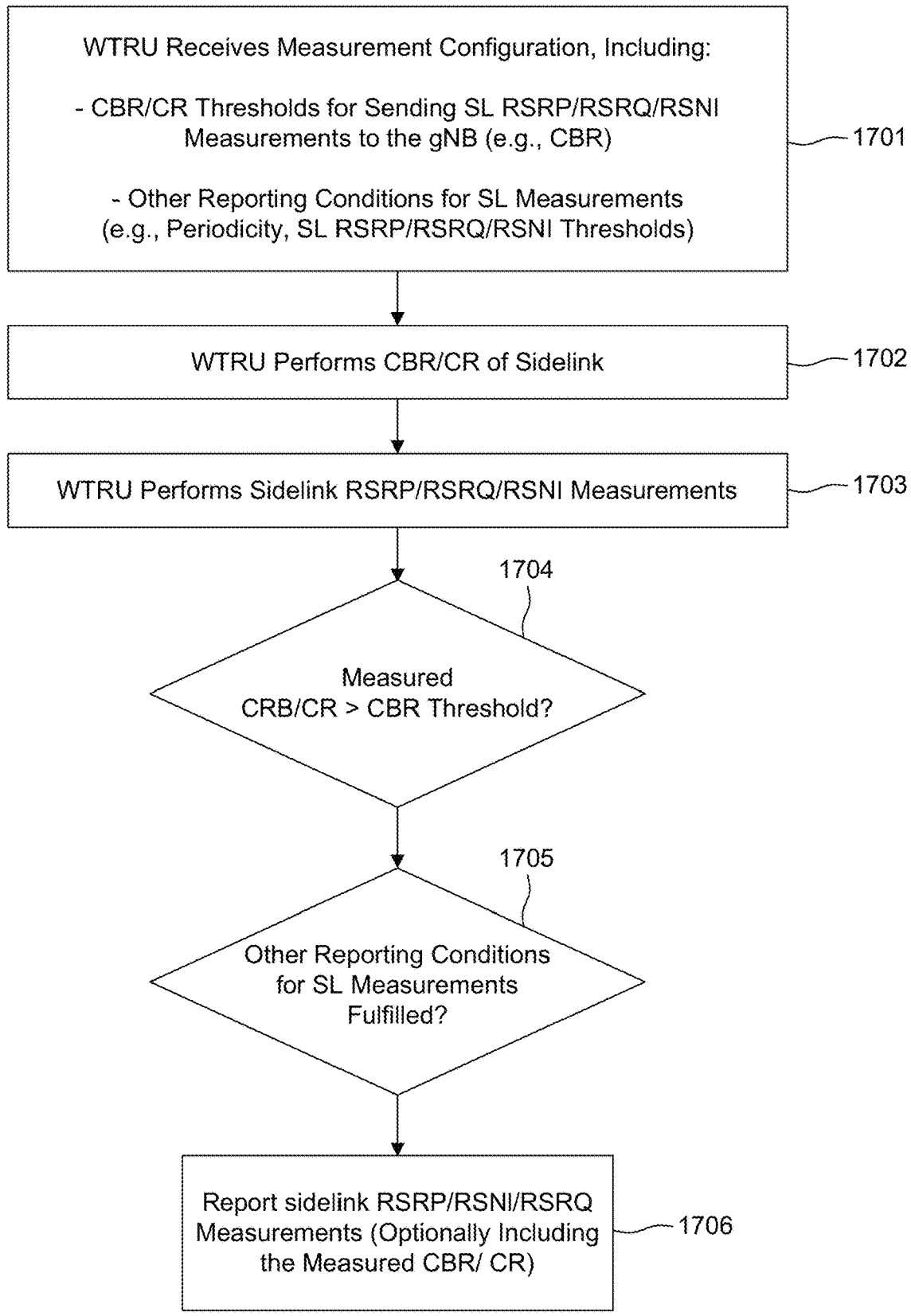
FIG. 17 illustrates an example of a measurements/reporting method.

FIG. 17 illustrates an example of how CBR/CR related measurements may be used to determine when the remote WTRU sends SL-RSRP/RSRQ/RSNI measurements and/or Uu measurements. Generally, CBR/CR related measurements may be used to determine when the remote WTRU sends SL-RSRP/RSRQ/RSNI measurements and/or Uu measurements. For example, the WTRU may be configured to send the SL radio related measurements and/or Uu measurements when the CBR/CR is above or below a certain threshold. This may be further combined with the S1/S2 like thresholds or periodic reporting configuration. For example, the remote WTRU may send the report only when the CBR/CR threshold is above/below a certain threshold and the SL-RSRP and/or Uu RSRP is above/below another threshold. For example, the WTRU may not send a periodic measurement report if the CBR/CR threshold is above/below a certain threshold and the SL-RSRP is above a certain threshold.

As shown in the example of FIG. 17, at 1701 the WTRU may receive configuration information relating to measurements/reporting. This configuration information may include one or more of the following: CBR/CR thresholds for sending SL RSRP/RSRQ/RSNI measurements to the base station, such as CBR; other reporting conditions for SL measurements, such as periodicity, SL RSRP/RSRQ/RSNI thresholds; and/or, other related measurements, such as those disclosed herein. At 1702, the WTRU may perform CBR/CR measurements of one or more sidelinks. At 1703, the WTRU may perform sidelink measurements (e.g., RSRP/RSRQ/RSNI). At 1704 and 1705, the WTRU may assess whether one or more of the thresholds indicated in the configuration information are met. Note, 1702, 1703, 1704, and/or 1705 may be selectively performed, meaning there may be an assessment of just one threshold, even though two are shown in the example of FIG. 17. At 1706, the WTRU may report on one or more of the configured measurements based on the assessments of the thresholds, such as reporting sidelink RSRP/RSNI/RSRQ measurements and optionally including CBR/CR.

In one instance, the SL-RSRP/RSRQ/RSNI measurements may be used to determine when the remote WTRU sends the CBR/CR related measurements. For example, the WTRU may be configured to send the CBR/CR related measurements when the SL-RSRP/RSRPQ/RSNI is above a certain threshold.

In one instance, the SL-RSRP/RSRQ/RSNI measurements may be scaled (e.g., multiplied by a certain scaling factor) based on the CBR. For example, when the CBR is below threshold 1, the measurements are not scaled, if the CBR is between threshold 1 and threshold 2, the measurement results are scaled down by a first scaling factor, when the CBR is above threshold 2, the measurement results are scaled down by a second scaling factor, or the like. The amount by which the measurements are scaled may further depend on the measured SL-RSRP/RSRQ/RSNI. For example, a different set of CBR thresholds corresponding to a specific amount may be configured for each range of SL-RSRP/RSRQ/RSNI.

Different thresholds and/or amounts may further be configured for reporting Uu measurements versus reporting of SL measurements.

In one approach, the WTRU may be configured to perform sidelink measurements by the relay WTRU, and send the measurements to the relay WTRU, which is then forwarded by the relay WTRU to the base station. The base station may configure the relay WTRU to forward the sidelink measurements, and how to forward them. In some cases, all sidelink measurements may be immediately forwarded by the relay WTRU. In other cases, the sidelink measurements may be forwarded only when certain conditions/thresholds are met. Such conditions may be associated with any of the following: the value of the measurements themselves (e.g., a relay WTRU may forward the measurements only when the value is above a threshold); the measurements of CBR (e.g., a relay WTRU may determine whether to forward the measurements based on a condition which depends on the measured CBR on SL, such as when the measured CBR on SL is above/below a threshold); the Uu measurements (e.g., a relay WTRU may forward the measurements when the Uu RSRP measurements are above a threshold); the RRC state of the relay and/or remote WTRU (e.g., the relay WTRU may forward the measurements only when the relay WTRU is in RRC connected; e.g., the relay WTRU may forward the measurements only when the remote WTRU is in RRC connected); and/or, conditions related to the established SL bearers or RLC channels between the relay and remote WTRU (e.g., the relay WTRU may forward the measurements only when there is at least one RLC channel, possibly associated with relaying of Uu traffic, established between the relay and remote WTRU; e.g., the relay WTRU may forward the measurements to the network only if there is at least one RLC channel established, where the configuration of such RLC channels requires such forwarding either explicitly in the configuration or implicitly, such as associated with the QoS profile to which the RLC channel is configured).

The relay WTRU may be configured to forward only a subset of the measurement reports it has received from the remote WTRU (e.g., every other measurement, every 3rd measurement, etc.). The relay WTRU may also be configured to perform some averaging/filtering of the measurements. For example, the relay WTRU may be configured to forward the measurements every x measurement report(s) that it gets from the remote WTRU, and include the average of the last n measurements in that report (where x can be the same or different from n, e.g., x=10, n=5).

The relay WTRU may be configured to forward the measurements periodically. For example, the relay WTRU may forward the measurement reports every x ms, including the latest measurement results that it has received from the remote WTRU.

If no new measurement report(s) have not been received from the remote WTRU since the last time the relay WTRU has forwarded the measurements to the base station when it is time to send the next report, the relay WTRU may repeat the last measurement report (e.g., always forward the last measurement report, regardless of how recent they are) or just provide an indication that no new measurements are available (e.g., send empty measurement report, send an explicit indication via a MAC CE, or other means, such as those disclosed herein, that indicate there are no new measurements available).

The relay WTRU may be configured with a timing configuration (e.g., freshness period), and only report measurements that are not older than this. In one case, if the report is not fresh enough, the relay WTRU may refrain from sending any report (e.g., or send an indication regarding that, either via an empty measurement report or an explicit indication via a MAC CE or other means). In another case, the relay WTRU may forward reports that do not meet the freshness criteria but include an indication regarding that.

This indication may be a simple flag indicating that the report is not recent, or it could be an explicit timing information indicating the elapsed time since the measurement report was received at the relay WTRU or only the extra time after the freshness period. For example, if the measurement report was received 150 ms ago, and the freshness period was 100 ms, the relay WTRU may indicate 150 ms (in the first case) or 50 ms (in the latter case).

The relay WTRU may be provided with some averaging/filtering window, which may be based on time duration or number of measurements, and may use this to average/summarize the measurements received from the remote WTRU before forwarding them to the base station. In some cases, the averaging window duration may be the same as the reporting periodicity (e.g., the relay WTRU averages all the measurement reports it has received by the remote WTRU every x ms, and also forwards the measurements every x ms). In other cases, the averaging window may be different from the reporting period (e.g., the report is sent every x ms, but the averaging considers only the measurements received in the last y ms). When averaging based on the number of measurements, similar considerations may be made (e.g., report every x ms, but consider only the last n measurements received during that period).

The relay WTRU may be configured with threshold(s) and other filtering parameters, and may forward the measurements from the remote WTRU when one or more criteria are fulfilled. One criterion may be that the relay WTRU may be configured with a threshold (e.g., threshold 1), and forwards the measurements received from the remote WTRU if the measurements are below that threshold. One criterion may be that the relay WTRU may be configured with a threshold (e.g., threshold 2), and forwards the measurements received from the remote WTRU if the measurements are above that threshold. One criterion may be that the relay WTRU may be configured with two thresholds (e.g., threshold 1 and threshold 2), and forwards the measurements received from the remote WTRU if the measurements falls between these two thresholds. Time to trigger (TTT) and/or hysteresis/offset values may also be included in the criteria, and these may be used by the relay WTRU to ensure that measurements are not forwarded just based on one measurement report. For example, when the measurement received from the remote WTRU fulfills the criteria (e.g., below a certain threshold, above a certain threshold, etc.), the relay WTRU may start a timer (e.g., with value set to the TTT), and forwards the measurement to the base station only if no measurements are received from the remote WTRU that do not fulfill the criteria.

In the approaches/examples described herein, averaging may be a simple linear averaging (e.g., all measurements being considered having equal weight), or it may be time biased, where the recent measurements have more weight than the older one.

In one case, the relay WTRU may send to the base station the measurements that it has performed on the sidelink. This measurement may be sent either separately or in conjunction with measurements performed by the remote WTRU that are forwarded according to any of the approaches/examples described herein. If sent separately, the relay WTRU may be configured with configurations such as periodicity, averaging windows, time to trigger, hysteresis, and the like, that are applied only to the measurements performed by the relay WTRU. If sent together, the same or different configurations may be provided regarding the measurements of the relay WTRU and the remote WTRU.

In one case, the relay WTRU may provide the sidelink measurements (e.g., either the measurements by the remote WTRU or the measurements by the relay WTRU itself) on a demand basis upon an explicit request from the base station. In this explicit request (e.g., an RRC message, a MAC CE, etc.), the base station may indicate extra parameters such as whether the desired measurement is the measurement performed by the relay WTRU and/or by the remote WTRU, thresholds, averaging windows, etc. (e.g., base station may instruct the relay WTRU to send the linearly averaged measurement results from the remote WTRU during the last x ms, or to send the report only if the results are above a certain threshold, etc.).

In one approach, a WTRU may be configured to measure/report additional measurement quantities. In some cases of legacy sidelink measurements, only the SL-RSRP may have been considered. While this may be sufficient for some cases, such as the case of power control by the peer WTRUs, for the sake of handover, it may be beneficial to consider not only signal strength, but also signal quality. For example, a WTRU (remote or relay WTRU) may be configured to perform and report measurements based on SL-RSRQ or SL-SINR (e.g., the thresholds associated to the enhanced S1/S2 like measurements discussed above to consider RSRQ instead of or in addition to RSRP). The remote WTRU may be configured, according to any of the techniques described herein, to measure and report one quantity for the relay WTRU, and another quantity for the base station. For example, the WTRU may be configured with an S1 like measurement that includes both SL-RSRP and SL-RSRQ thresholds, and when the SL-RSRP thresholds are fulfilled, it reports the measurements to the relay WTRU, while reporting to the base station only when the SL-RSRQ thresholds are fulfilled. Note, that the triggering quantities does not necessarily have to be the same as the reporting quantities. Continuing with the previous example, when reporting to the base station based on SL-RSRQ threshold being fulfilled, the WTRU may include RSRP or/and RSRQ results in the measurement report.

In one approach, the sidelink measurement configuration may have different thresholds (or other parameters such as TTT, hysteresis, averaging window, reporting intervals, etc.) that are dependent on how the sidelink measurements are performed and/or which SL channel or SL message is being used to perform the measurements. For example, the WTRU can be configured with different sets of parameters, the first set of parameters to be used when sidelink measurements are done based only on discovery signals (e.g., when there is no data being transported via sidelink), another set of parameters to be used when sidelink measurements are done based on data (e.g., when there is data being transported via sidelink).

Additionally, another set of parameters may be used when sidelink measurements are done based on both data and discovery signals. Additionally, a different set of parameters may be configured if the WTRU performs measurements on data using RSs transmitted with the peer WTRU's data, or if the WTRU performs measurements on data using SL-RSRP reports sent by the peer WTRU. Sidelink measurements on data defined herein may refer to generating a measurement report (e.g., to send to the base station) either from measurements of SL RSs sent with data (by the peer WTRU) or generating such measurement from the measurement of SL-RSRP sent by the peer WTRU.

A WTRU may change from one set of parameters to another set of parameters based on one or more of the following: when the WTRU starts measuring the a different channel (e.g., measurements on data start to become available, or data starts to be transmitted); a period of time after the WTRU starts measuring a different channel (e.g., some (pre)configured time after data becomes available), where such time may further depend on which channel (discovery or data) is the new target channel being measured; and/or, when a certain amount/percentage (e.g., majority/all) of measurements averaged by L3 filtering is associated with the different channel.

In one approach, a WTRU may be configured with rules/conditions on when it performs measurements on discovery signals and/or measurements on data. Sidelink measurements on data defined herein may refer to generating a measurement report (e.g., to send to the base station) either from measurements of SL RSs sent with data (by the peer WTRU) or generating such measurement from the measurement of SL-RSRP sent by the peer WTRU. Specifically, measurement reports of sidelink sent to the base station may be any or a combination of measurements on discovery, measurements on RSs from peer WTRU transmissions, or measurements based on SL-RSRP reports received from the peer WTRU.

A WTRU may transmit all available measurements to the base station, potentially in the same/different measurement report and/or by identifying the specific measurement type. Alternatively, the WTRU may transmit a specific type of measurement depending on specific rules/conditions, possibly associated with that measurement. The conditions may result in the WTRU measuring/sending one type of measurement (as opposed to, or in addition to) another type of measurement if such condition is met. Such rules/conditions may be any or a combination of: presence of discovery transmissions by the peer WTRU (e.g., the WTRU may perform/send measurements based on discovery if discovery transmissions are configured by the WTRU/peer WTRU, or if the WTRU received discovery); presence/absence of SL-RSRP reports from the peer WTRU or SL-RSRP configured at the WTRU by the peer WTRU (e.g., a WTRU may perform/send measurements data are not available); presence/absence of data for reception/transmission (e.g., a WTRU may perform SL measurements only on discovery when there is no data for transmission available, and hence no opportunity to request SL measurements on data); based on the nature/frequency of data transmissions (e.g., whether transmissions and/or receptions are periodic, and/or whether the period meets a specific criteria; e.g., a WTRU may perform SL measurements only on discovery if it does not have periodic data receptions which it can use for performing measurements); based on the WTRU's transmission power (e.g., a WTRU may perform/send SL measurements on data, such as from received SL-RSRP reports when the WTRU's transmission power is above/below a threshold); measurement of SL congestion (e.g., CBR/CR) (e.g., a WTRU may send only one type of measurement, such as discovery only, when multiple are available when the CBR is above a threshold; otherwise, it may send all types of measurements); and/or, based on the value of the measurement (e.g., the WTRU may send the measurement report of the measurement type which has the largest/smallest value; e.g., the WTRU may send a specific measurement report of a given type if the measured value is above/below a threshold).

In one instance, a WTRU may average the values associated with different measurement type before sending the measurement report to the network. The WTRU may further indicate which measurement type(s) were included in the averaged measurement.

In some cases, in a relay scenario, it may be useful to compare more than one link measured at the remote WTRU, such as comparing sidelink and Uu/Sidelink. In some cases, the report for these comparisons may have specific trigger events, where a certain result based on the comparison occurs.

In one approach, the WTRU may be configured to perform/report measurements that are based on comparing the sidelink and Uu measurements, either to absolute thresholds, or to each other.

In one example of an absolute comparison, the WTRU may be connected via a direct link to its destination and a neighboring link (e.g., a candidate) may be a sidelink (e.g., this event may be where a SpCell becomes worse than a first threshold and neighbor sidelink becomes better than a second threshold). In one example of an absolute comparison, the WTRU may be connected to sidelink and the neighboring link may be a Uu link (e.g., this event may be where the serving sidelink becomes worse than a first threshold and the neighbor Uu becomes better than a second threshold).

In one example of a relative comparison, the WTRU may be currently connected to a direct link and a neighboring link is a sidelink (e.g., this event may be where the neighbor sidelink becomes an amount of offset better than PCell/PSCell; alternatively/additionally, this may be an event where an inter-RAT sidelink neighbor(s) becomes an amount of offset better than PCell/PSCell). In one example of a relative comparison, the WTRU may be connected to sidelink and the neighboring link is a sidelink (e.g., this event may be where a neighbor becomes an amount of offset better than the serving sidelink; additionally/alternatively, this may be an event where an Inter-RAT neighbor(s) becomes an amount of offset better than serving sidelink).

In one approach, the WTRU may be configured with different parameters for the sidelink and Uu measurements, such as when the WTRU is receiving configuration information relating to measurement events as disclosed herein. For example, in in some types of measurements (e.g., NR) the parameters reportInterval and reportAmount (e.g., information elements), when configured for an event triggered measurement, may specify that once the measurement reporting has been triggered (e.g., conditions of the event configuration are fulfilled), the WTRU may send a reportAmount of measurement reports every reportInterval. Different reportInterval and reportAmount values may be configured for the sidelink and Uu measurements, once the event is triggered, the WTRU may send the sidelink measurements according to the corresponding sidelink parameters, and the Uu measurements according to the corresponding Uu parameters.

In one approach, the absolute or relative event-based measurement configurations may be provided to the WTRU by the relay WTRU, by the base station, or a combination of both. For example, for the case of absolute comparisons where the WTRU is currently connected indirectly, the relay WTRU may provide the thresholds for the sidelink related measurements, while the base station provides the thresholds for the Uu related measurements.

In one approach, absolute and relative conditions may consider CBR/CR related measurements instead or in addition to SL-RSRP/RSRQ/RSNI measurements.

In one example for absolute comparisons, the WTRU may be connected to a direct link and the neighboring (e.g., candidate) link is a sidelink (e.g., this event may be where the SpCell radio becomes worse than a first threshold and the neighbor sidelink CBR/CR becomes less than a second threshold; e.g., this may be an where SpCell radio becomes worse than a first threshold and the neighbor sidelink CBR/CR becomes less than second threshold or neighbor sidelink radio quality becomes better than a third threshold; and/or, this event may be where SpCell radio becomes worse than a first threshold and a neighbor sidelink CBR/CR becomes less than a second threshold and the neighbor sidelink radio quality becomes better than a third threshold).

In one example for absolute comparison, the WTRU may be connected via sidelink, and the neighbor link is a sidelink (e.g., this event may be where a serving sidelink CBR/CR becomes greater than a first threshold and the neighbor Uu radio becomes better than a second threshold; e.g., this event may be where a serving sidelink CBR/CR becomes greater than a first threshold or the serving sidelink radio quality becomes worse than a third threshold and the neighbor Uu radio becomes better than a second threshold; and/or, e.g., this event may be where the serving sidelink CBR/CR becomes greater than a first threshold and the serving sidelink radio quality becomes worse than a third threshold and the neighbor Uu radio becomes better than a second threshold).

In one example for relative comparisons, the WTRU may currently be connected via a direct link, and the neighboring link is a sidelink (e.g., this may be an event where a neighbor sidelink radio quality becomes an amount of offset better than PCell/PSCell or the neighbor sidelink CBR/CR becomes lower than a first threshold; e.g., this may be an event where a neighbor sidelink radio quality becomes an amount of offset better than the PCell/PSCell and the neighbor sidelink CBR/CR becomes lower than a first threshold; e.g., this may be an event where inter-RAT sidelink neighbor radio quality becomes an amount of offset better than PCell/PSCell or inter-RAT sidelink neighbor CBR/CR becomes lower than a first threshold; and/or, e.g., this may be an event where an inter-RAT sidelink neighbor radio quality becomes an amount of offset better than PCell/PSCell and the inter-RAT sidelink neighbor CBR/CR becomes lower than a first threshold).

In one example for relative comparisons, the WTRU may be connected via sidelink, and the neighboring link is a sidelink (e.g., this may be an event where a neighbor becomes an amount of offset better than serving sidelink or serving sidelink CBR/CR becomes greater than a first threshold; e.g., this may be an event where a neighboring link becomes an amount of offset better than the serving sidelink and the serving sidelink CBR/CR becomes greater than a first threshold; this may be an event where an inter-RAT neighbor becomes an amount of offset better than serving sidelink or the serving sidelink CBR/CR becomes greater than a first threshold; and/or, e.g., this may be an event where an inter-RAT neighboring link becomes an amount of offset better than the serving sidelink and the serving sidelink CBR/CR becomes greater than a first threshold).

Based on one or more techniques described herein, in one relay scenario a WTRU may be configured to operate as a remote WTRU for connecting to a base station (e.g., gNB) via a relay WTRU. In one example, the remote WTRU may perform one or more of the following operations: the WTRU receives, from the NW or the relay WTRU, a measurement configuration related to the sidelink; the measurement configuration contains channel busy rate/channel occupancy ratio (CBR/CR) thresholds for performing measurements on neighboring (e.g., non-serving) radio link (e.g., a neighbor sidelink, a neighbor direct link); and/or, when the measured CBR/CR is above the configured thresholds, the WTRU starts performing measurements of the neighboring radio links (e.g., measurement of neighbor sidelink or neighbor direct link radio conditions). These embodiments may be similar to an s-measure, but based on congestion rather than radio signal(s).

Based on one or more techniques described herein, a WTRU may be configured to operate as a remote WTRU for connecting to a base station (e.g., gNB) via a relay WTRU. In one example, the remote WTRU may perform one or more of the following operations: the WTRU receives, from the NW or the relay WTRU, a measurement configuration related to the sidelink; the measurement configuration contains trigger conditions/events for reporting the radio conditions of serving links (e.g., sidelink or direct link currently serving the WTRU) or neighbor links (e.g., sidelink or direct link not serving the WTRU); the WTRU performs the sidelink/direct link measurements; the WTRU performs the CBR/CR measurements; and/or, when the triggering conditions are met, the WTRU sends the measurement results containing serving/neighbor sidelink/direct link radio conditions and measured CBR/CR, to the relay WTRU or the base station. The trigger conditions may comprise one or more of the following: sidelink/direct link RSRP/RSRQ/RSNI thresholds; relative offsets between serving and neighbor sidelink/direct links; sidelink CBR/CR thresholds; priority of active sidelink RLC channels; UL pending data threshold; Downlink data reception rate/volume threshold; and/or, reporting periodicity. These embodiments may cover the case of performing the measurements and reporting it to the base station or relay WTRU, as well as events that can compare serving and neighbor measurements, that also take into consideration CBR, RLC channel priority, UL/DL data rate/volume, or the like.

Based on one or more techniques described herein, a WTRU may be configured to operate as a relay WTRU for connecting a remote WTRU to a base station (e.g., gNB). In one example, the relay WTRU may perform one or more of the following operations: the relay WTRU receives, from the remote NW, a measurement configuration related to the sidelink; the measurement configuration contains trigger conditions/events for reporting the radio conditions of serving links (sidelink or direct link currently serving the WTRU) or neighbor links (sidelink or direct link not serving the WTRU); the relay WTRU performs the sidelink RSRP/RSRQ/RSNI measurements or receives the measurements from the remote WTRU; the relay WTRU performs the measurements on the direct link between the relay WTRU and the base station; the relay WTRU performs the CBR/CR measurements; and/or, when the triggering conditions are met, the relay WTRU sends the measurement results containing serving/neighbor sidelink/direct link radio conditions and measured CBR/CR, to the base station. The trigger conditions may comprise one or more of the following: sidelink RSRP/RSRQ/RSNI thresholds; RSRP/RSRQ/RSNI thresholds concerning the direct link between the relay WTRU and the base station; sidelink CBR/CR thresholds; priority of active sidelink RLC channels; UL pending data threshold (e.g., buffered data at the relay WTRU or buffered data at the remote WTRU as reported by the remote WTRU buffer status report); downlink data reception rate/volume threshold; and/or, reporting periodicity.

As described herein, a higher layer may refer to one or more layers in a protocol stack, or a specific sublayer within the protocol stack. The protocol stack may comprise of one or more layers in a WTRU or a network node (e.g., base station, other functional entity, etc.), where each layer may have one or more sublayers. Each layer/sublayer may be responsible for one or more functions. Each layer/sublayer may communicate with one or more of the other layers/sublayers, directly or indirectly. In some cases, these layers may be numbered, such as Layer 1, Layer 2, and Layer 3. For example, Layer 3 may comprise of one or more of the following: Non-Access Stratum (NAS), Internet Protocol (IP), and/or Radio Resource Control (RRC). For example, Layer 2 may comprise of one or more of the following: Packet Data Convergence Control (PDCP), Radio Link Control (RLC), and/or Medium Access Control (MAC). For example, Layer 3 may comprise of physical (PHY) layer type operations. The greater the number of the layer, the higher it is relative to other layers (e.g., Layer 3 is higher than Layer 1). In some cases, the aforementioned examples may be called layers/sublayers themselves irrespective of layer number, and may be referred to as a higher layer as described herein. For example, from highest to lowest, a higher layer may refer to one or more of the following layers/sublayers: a NAS layer, a RRC layer, a PDCP layer, a RLC layer, a MAC layer, and/or a PHY layer. Any reference herein to a higher layer in conjunction with a process, device, or system will refer to a layer that is higher than the layer of the process, device, or system. In some cases, reference to a higher layer herein may refer to a function or operation performed by one or more layers described herein. In some cases, reference to a high layer herein may refer to information that is sent or received by one or more layers described herein. In some cases, reference to a higher layer herein may refer to a configuration that is sent and/or received by one or more layers described herein.

Although features and elements are described above in particular combinations, one of ordinary skill in the art will appreciate that each feature or element can be used alone or in any combination with the other features and elements. As described herein, reference to approaches, examples, cases, instances, or other such words may be interchangeable and are not intended to be referentially limiting to one or another. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:
1. A method implemented by a wireless transmit receive unit (WTRU), the method comprising:
receiving configuration information through a relay WTRU connected to the WTRU, wherein the configuration information originates from a base station, wherein the configuration information comprises two or more thresholds for measurement reporting on one or more signals, wherein a first threshold is associated with sidelink Reference Signal Received Power (RSRP) measurements and a second threshold is asso- ciated with sidelink discovery RSRP measurements, wherein the one or more signals are one or more sidelink transmissions;

measuring RSRP of one or more signals; and upon determining at least a value, based on one or more RSRP measurements of the one or more signals, meets at least one of the first threshold or the second threshold, sending a measurement report to the base station, wherein the measurement report includes the value based on the one or more RSRP measurements of the one or more signals and a measurement type, wherein the measurement type indicates that the value was based on at least one data transmission or at least one discovery signal.

2. The method of claim 1, wherein the one or more signals include a transmission from a candidate relay WTRU to the WTRU.

3. The method of claim 1, wherein the one or more signals include a transmission from the relay WTRU to the WTRU.

4. The method of claim 1, wherein the configuration information further includes Uu RSRP measurement information.

5. The method of claim 4, further comprising:
receiving an RRCReconfiguration message from the base station for switching the WTRU to a direct Uu path after sending the measurement report to the base station.

6. The method of claim 5, further comprising:
sending an RRCReconfigurationComplete to the base station after receiving the RRCReconfiguration message.

7. The method of claim 4, further comprising:
sending at least one Uu RSRP measurement to the base station based on the Uu RSRP measurement information.

8. The method of claim 1, wherein the measurement report includes a WTRU's ID.

9. The method of claim 1, wherein the measurement report is sent through the relay WTRU.

10. A wireless transmit/receive unit (WTRU), the WTRU comprising:
a processor operatively connected to a transceiver, the processor and transceiver configured to receive configuration information through a relay WTRU connected to the WTRU, wherein the configuration information originates from a base station, wherein the configuration information comprises two or more thresholds for measurement reporting on one or more signals, wherein a first threshold is associated with sidelink Reference Signal Received Power (RSRP) measurements and a second threshold is associated with sidelink discovery RSRP measurements, wherein the one or more signals are one or more sidelink transmissions;

the processor and transceiver configured to measure RSRP of one or more signals; and upon determining at least a value, based on one or more RSRP measurements of the one or more signals, meets at least one of the first threshold or the second threshold, the processor and transceiver configured to send a measurement report to the base station, wherein the measurement report includes the value based on the one or more RSRP measurements of the one or more signals and a measurement type, wherein the measurement type indicates that the value was based on at least one data transmission or at least one discovery signal.

11. The WTRU of claim 10, wherein the one or more signals include a transmission from a candidate relay WTRU to the WTRU.

12. The WTRU of claim 10, wherein the one or more signals include a transmission from the relay WTRU to the WTRU.

13. The WTRU of claim 10, wherein the configuration information includes Uu RSRP measurement information.

14. The WTRU of claim 13, wherein the processor and transceiver are further configured to receive an RRCReconfiguration message from the base station for switching the WTRU to a direct Uu path after sending the measurement report to the base station.

15. The WTRU of claim 14, wherein the processor and transceiver are further configured to send an RRCReconfigurationComplete to the base station after receiving the RRCReconfiguration message.

16. The WTRU of claim 13, wherein the processor and transceiver are further configured to send at least one Uu RSRP measurement to the base station based on the Uu RSRP measurement information.

17. The WTRU of claim 10, wherein the measurement report includes a WTRU's ID.

18. The WTRU of claim 10, wherein the measurement report is sent through the relay WTRU.

19. A method implemented by a remote wireless transmit receive unit (WTRU), the method comprising:
receive configuration information, wherein the configuration information is received via a relay WTRU connected to the WTRU, wherein the configuration information originates from a base station, wherein the configuration information comprises one or more thresholds of sidelink Reference Signal Received Power (RSRP) measurements for triggering measurement reporting, wherein a first threshold of the one or more thresholds is associated with measurement of one or more sidelink discovery signals, wherein a second threshold of the one or more thresholds is associated with measurement of one or more sidelink data transmissions;

measuring the RSRP of one or more signals, wherein the one or more signals are one or more sidelink discovery signals or one or more sidelink data transmissions; and upon determining at least a value, based on one or more RSRP measurements of the one or more signals, meets at least one of the first threshold or the second threshold, sending a measurement report to the base station, wherein the measurement report includes the value based on the one or more RSRP measurements of the one or more signals and a type of the measurement, wherein the type of the measurement indicates that the value was based on one or more sidelink discovery signals or one or more sidelink data transmissions.

20. The method of claim 19, further comprising:
receiving an RRCReconfiguration message from the base station for switching the WTRU to a direct Uu path after sending the measurement report to the base station; and
sending an RRCReconfigurationComplete to the base station after receiving the RRCReconfiguration message.

* * * * *

UNITED STATES PATENT AND TRADEMARK OFFICE
CERTIFICATE OF CORRECTION

PATENT NO. : 12,207,145 B2  
APPLICATION NO. : 18/771668  
DATED : January 21, 2025  
INVENTOR(S) : Oumer Teyeb et al.

Page 1 of 1

It is certified that error appears in the above-identified patent and that said Letters Patent is hereby corrected as shown below:

In the Claims
In Claim 20, at Column 42, Line 58, after the words "switching the" delete the word "WTRU", and insert therefor --remote WTRU--.

Signed and Sealed this
Twenty-fifth Day of February, 2025

Coke Morgan Stewart
*Acting Director of the United States Patent and Trademark Office*